(12) United States Patent
Cohen et al.

(10) Patent No.: US 11,595,093 B2
(45) Date of Patent: *Feb. 28, 2023

(54) RADIO FREQUENCY BEAMFORMING CALIBRATION SYSTEMS AND METHODS

(71) Applicant: Apple Inc., Cupertino, CA (US)

(72) Inventors: Mik V H Cohen, Raanana (IL); Ran Shimon, Givaatayim (IL); Shay Gershoni, Hadera (IL)

(73) Assignee: Apple Inc., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/181,954

(22) Filed: Feb. 22, 2021

(65) Prior Publication Data
US 2021/0175947 A1 Jun. 10, 2021

Related U.S. Application Data

(63) Continuation of application No. 15/931,379, filed on May 13, 2020, now Pat. No. 10,931,345, which is a continuation of application No. 16/379,377, filed on Apr. 9, 2019, now Pat. No. 10,680,693.

(51) Int. Cl.
*H04B 7/06* (2006.01)
*H04B 17/21* (2015.01)
*H04B 17/11* (2015.01)

(52) U.S. Cl.
CPC ........... *H04B 7/0617* (2013.01); *H04B 17/11* (2015.01); *H04B 17/21* (2015.01)

(58) Field of Classification Search
CPC .. H04B 7/0617; H04B 17/00; H04B 17/0085; H04B 17/11; H04B 17/12; H04B 17/14; H04B 17/19; H04B 17/21; H04B 17/29; H04B 17/391; H04B 3/00; H04B 3/46; H04B 3/462; H04B 10/07
See application file for complete search history.

(56) References Cited

U.S. PATENT DOCUMENTS 7,392,015 B1 6/2008 Farlow et al.
9,226,184 B2 12/2015 Silverman et al.
9,444,577 B1 9/2016 Zhang et al.
(Continued)

FOREIGN PATENT DOCUMENTS

WO 2014052879 A1 4/2014

*Primary Examiner* — Siu M Lee
(74) *Attorney, Agent, or Firm* — Fletcher Yoder PC

(57) ABSTRACT

Systems and methods for improving testing and/or calibration efficiency of radio frequency system. In some embodiments, a testing system includes a beamformer radio frequency system, in which the beamformer radio frequency system includes first transceiver circuitry and a first plurality of antennas coupled to the first transceiver circuitry, a beamformee radio frequency system, in which the beamformee radio frequency system includes second transceiver circuitry and a second plurality of antennas coupled to the second transceiver circuitry, one or more wired connections coupled between the first transceiver circuitry of the beamformer radio frequency system and the second transceiver circuitry of the beamformee radio frequency system, in which each of the one or more wired connections bypasses the first plurality of antennas of the first radio frequency system and the second plurality of antennas of the second radio frequency system.

19 Claims, 9 Drawing Sheets

(56) References Cited

U.S. PATENT DOCUMENTS

| | | |
|---|---|---|
| 9,661,517 B2 | 5/2017 | Stott et al. |
| 10,033,473 B1 * | 7/2018 | Kyrolainen .......... H04B 17/391 |
| 10,079,626 B1 | 9/2018 | Olgaard et al. |
| 10,680,693 B1 | 6/2020 | Cohen et al. |
| 10,790,915 B2 * | 9/2020 | DaSilva ............. G01R 31/2856 |
| 10,931,345 B2 * | 2/2021 | Cohen .................... H04B 17/11 |
| 2008/0274712 A1 * | 11/2008 | Rofougaran ........ H01P 1/20372 |
| | | 455/333 |
| 2013/0272254 A1 * | 10/2013 | Goto ................. H04W 72/0406 |
| | | 370/329 |
| 2015/0092824 A1 * | 4/2015 | Wicker, Jr ........... H04B 17/336 |
| | | 375/224 |
| 2016/0020834 A1 | 1/2016 | Li et al. |
| 2017/0331533 A1 * | 11/2017 | Strong ................... G01C 21/18 |
| 2017/0359739 A1 | 12/2017 | Reed |
| 2018/0337738 A1 * | 11/2018 | Wen ....................... H04B 17/12 |
| 2019/0044583 A1 * | 2/2019 | Garcia ................ H04L 27/2607 |
| 2019/0058530 A1 | 2/2019 | Rainish et al. |
| 2019/0190624 A1 | 6/2019 | Kyosti et al. |
| 2019/0222385 A1 * | 7/2019 | Hessler ................ H04L 5/0048 |

\* cited by examiner

RADIO FREQUENCY BEAMFORMING CALIBRATION SYSTEMS AND METHODS

SYSTEMS AND METHODS

This application is a continuation of U.S. patent application Ser. No. 15/931,379, filed May 13, 2020 and entitled "RADIO FREQUENCY BEAMFORMING CALIBRATION SYSTEMS AND METHODS," which is a continuation of U.S. patent application Ser. No. 16/379,377, filed Apr. 9, 2019 and entitled "RADIO FREQUENCY BEAMFORMING CALIBRATION SYSTEMS AND METHODS," now U.S. Pat. No. 10,680,693, which are both incorporated herein by reference in their entirety for all purposes.

BACKGROUND

The present disclosure generally relates to radio frequency systems and, more particularly, to calibration and/or testing of beamforming (e.g., beamsteering) techniques implemented in a radio frequency system.

This section is intended to introduce the reader to various aspects of art that may be related to various aspects of the present techniques, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

Electronic devices often include a radio frequency system to facilitate wireless data communication with another electronic device and/or a communication network, such as a Wi-Fi network and/or a cellular network. Generally, a radio frequency system may include transceiver circuitry and an antenna, which is coupled to the transceiver circuitry. To facilitate wirelessly transmitting data, the transceiver circuitry may generate an analog representation of the data as an analog electrical signal and the antenna may modulate electromagnetic (e.g., radio) waves based at least in part on the analog electrical signal. Additionally or alternatively, the antenna may output an analog representation of received (e.g., incident) electromagnetic waves as an analog electrical signal and the transceiver circuitry may process the analog electrical signal, for example, to convert the analog electrical signal into a digital electrical signal to facilitate subsequent processing.

However, wireless communication between radio frequency systems is generally affected by communication conditions, such as propagation loss resulting between the radio frequency systems and/or presence of stray electromagnetic waves, which potentially vary. In fact, in some instances, a radio frequency system may adaptively adjust operation based at least in part on current communication conditions, for example, to facilitate balancing operational efficiency (e.g., power consumption) and communication reliability (e.g., communication distance and/or signal strength). To facilitate adaptive operation adjustment, in some instances, operation of a radio frequency system may be tested and/or calibrated under various communication conditions, for example, which are expected to occur during normal operation of the radio frequency system after deployment of an electronic device including the radio frequency system.

In other words, in some instances, a radio frequency system may be tested and/or calibrated by reproducing various sets of communication conditions (e.g., channel configurations) and operating the radio frequency system under the reproduced communication conditions. However, at least in some instances, reproducing a set of communication conditions may be a complex and/or time consuming process, for example, due to the set of communication conditions being physically reproducing using heavy equipment and/or an anechoic room. In other words, efficiency with which communication conditions may be reproduced may affect testing and/or calibration efficiency of a radio frequency system and, thus, an electronic device in which the radio frequency system is deployed.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

The present disclosure generally relates to radio frequency systems, which may be implemented in electronic devices to facilitate wireless communication (e.g., transmission and/or reception). At least in some instances, different communication networks and/or different radio frequency systems may utilize different communication protocols and/or different communication frequencies.

Nevertheless, radio frequency systems generally include transceiver (e.g., transmitter and/or receiver) circuitry and at least one antenna and, thus, operation of radio frequency systems may generally be similar. For example, to facilitate wirelessly transmitting data, the transceiver circuitry may generate an analog representation of the data as an analog electrical signal and the antenna may modulate electromagnetic (e.g., radio) waves based at least in part on the analog electrical signal. Additionally or alternatively, the antenna may output an analog representation of received (e.g., incident) electromagnetic waves as an analog electrical signal and the transceiver circuitry may process the analog electrical signal, for example, to convert the analog electrical signal into a digital electrical signal.

To facilitate improving operational efficiency and/or communication reliability, in some instances, radio frequency systems may be implemented with multiple antennas. In particular, in some instances, a (e.g., receiving or beamformee) radio frequency system may include an array of multiple antennas to enable the radio frequency system to receive multiple concurrently transmitted data streams, for example, using beamforming techniques. Additionally or alternatively, a (e.g., transmitting or beamformer) radio frequency system may include an array of multiple antennas to enable the radio frequency system to wirelessly transmit one or more data streams using beamforming techniques.

To implement beamforming techniques, a beamformer (e.g., transmitting) radio frequency system may concurrently transmit electromagnetic wave signals from multiple antennas such that additive and/or destructive interference therebetween produces one or more electromagnetic wave beams (e.g., concentrated strength) oriented in a target direction, such as toward a target beamformee (e.g., receiving) radio frequency system. In fact, at least in some instances, orientation of an electromagnetic wave beam produced by a beamformer radio frequency system may be adjusted by adaptively controlling phase and/or magnitude of analog electrical signals supplied to its antennas. In other words, at least in some instances, coding (e.g., beamforming) parameters to be used by a beamformer radio frequency system and/or a beamformee radio frequency system to implement beamforming techniques may be dependent at least in part on communication conditions, such as location (e.g., distance and/or orientation) of the beamformee radio frequency system relative to the beamformer radio frequency system.

However, communication conditions often vary, for example, due to a radio frequency system being moved and/or the radio frequency system communicating with different radio frequency systems at different times. To facilitate accounting for potential variations, in some instances, a target beamformee radio frequency system may determine current communication conditions, for example, based at least in part on distortion introduced on a beamforming initiation packet, such as a non-data packet (NDP), received from a beamformer radio frequency system. Additionally, based at least in part on the current communication conditions, the target beamformee radio frequency system may determine coding (e.g., encoding and/or decoding) parameters and return encoding (e.g., beamforming) parameters to the beamformer radio frequency system.

In this manner, the beamformer radio frequency system may process subsequent data packets based at least in part on the encoding parameters to facilitate wirelessly transmitting the data packets via one or more electromagnetic wave beams. Additionally or alternatively, the beamformee radio frequency system may process analog electrical signals output from its antennas and/or corresponding digital electrical signals based at least in part on decoding parameters to facilitate identifying the data packets. In other words, at least in some instances, coding (e.g., encoding and/or decoding) parameters determined for different sets of communication conditions may affect operational efficiency and/or communication reliability of radio frequency systems, for example, due to encoding parameters resulting in an electromagnetic wave beam oriented in an improper direction and/or a beamformer radio frequency system re-transmitting dropped packets.

Accordingly, to facilitate improving operational efficiency and/or communication reliability of radio frequency systems, the present disclosure provides techniques for implementing and/or operating a testing system to facilitate calibrating and/or testing performance (e.g., operation) of a radio frequency system under various sets of communication conditions. In some instances, a radio frequency system may be calibrated and/or tested by physically reproducing communication conditions and operating the radio frequency within the physically reproduced communication conditions. However, physically reproducing communication conditions is often a complex and/or time consuming process, which, at least in some instances, may limit calibration efficiency and/or testing efficiency of radio frequency systems, for example, due to a wireless communication channel being physically reproduced using heavy equipment and/or an anechoic room.

To facilitate improving calibration and/or testing efficiency, in some embodiments, a testing system may include a tester radio frequency system implemented and/or operated to emulate wireless communication, for example, on-chip. In some embodiments, a tester radio frequency system may emulate wireless communication by emulating the effect that transmission of a packet via a wireless communication channel is expected to have on the packet. In other words, before transmitting a packet, the tester radio frequency system may modify magnitude and/or phase of the packet based at least in part on distortion expected to be introduced due to wireless transmission of the packet.

In fact, in some embodiments, emulating wireless communication in this manner may enable calibration and/or testing of another (e.g., device under testing (DUT)) radio frequency system via one or more wired connections. For example, a testee radio frequency system may be wired to the tester radio frequency system in the testing system in a manner that bypasses their antennas. In other words, in such embodiments, transceiver circuitry of the tester radio frequency system may be coupled to transceiver circuitry of the testee radio frequency system via one or more wired connections and, thus, an analog electrical signal received by the transceiver circuitry of the testee radio frequency system may emulate transmission of one or more corresponding packets from the tester radio frequency system to the testee radio frequency system via a wireless communication channel.

As such, during a testing (e.g., calibration) process, a tester radio frequency system may operate similarly to a beamformer radio frequency system. However, during the testing process, the tester radio frequency system may process the beamforming initiation packet based on encoding parameters, which emulate the effect of communication conditions currently being tested, and output analog electrical signals indicative of the encoded packet to the testee radio frequency system via one or more wired connections. In other words, during the testing process, the set of encoding parameters applied by the tester radio frequency system may include channel emulation parameters and/or beamforming parameters. In particular, the tester radio frequency system may process a beamforming initiation packet based on the channel emulation parameters, for example, along with default (e.g., uniform gain and/or uniform phase shift) beamforming parameters. Additionally, the tester radio frequency system may process subsequent data packets based on the channel emulation parameters as well as updated (e.g., non-default) beamforming parameters returned from the tested radio frequency system.

Additionally, during the testing process, a testee radio frequency system may operate similarly to a beamformee radio frequency. However, during the testing process, the testee radio frequency system may return a set of beamforming (e.g., encoding) parameters to the tester radio frequency system via one or more wired connections. Additionally, during the testing process, the testee radio frequency system may receive packets transmitted from a tester radio frequency system via one or more wired connections.

In some embodiments, a testing system may evaluate performance of a testee radio frequency system as a beamformee based at least in part on one or more comparisons between different versions of a packet. In fact, in some embodiments, one or more data packets to be transmitted during the testing process may be pre-determined and stored in a tangible, non-transitory, computer-readable medium of the testing system, for example, in controller memory. By comparing different versions of a data packet, the testee may determine distortion and, thus, a packet error rate resulting from transmission of the data packet to the testee radio frequency system.

To facilitate improving performance as a beamformee, in some embodiments, the testing system may adaptively adjust configuration (e.g., programming and/or implementation) of a testee radio frequency system during the testing (e.g., calibration) process. For example, the testing system may adjust a current configuration of the testee radio frequency system such that the testee radio frequency system determines a different set of beamforming parameters if a current set of communication conditions is subsequently determined again. Additionally, in some embodiments, the testing system may adjust the current configuration of the testee radio frequency system when use of the previously returned set of beamforming parameters result in a packet error rate greater than an error threshold. In fact, in some embodiments, operation (e.g., performance) of the testee radio frequency system under different sets of communication conditions may be tested and/or calibrated merely be adjusting the channel emulation parameters applied by the tester radio frequency system. In this manner, as will be described in more detail below, the techniques described in the present disclosure may facilitate improving calibration efficiency and/or testing efficiency of a radio frequency system and, thus, an electronic device in which the radio frequency system is deployed, for example, by obviating wireless communication and, thus, physical reproduction of communication conditions during testing and/or calibration of the radio frequency system.

BRIEF DESCRIPTION OF THE DRAWINGS

Various aspects of the present disclosure may be better understood upon reading the following detailed description and upon reference to the drawings in which.

DETAILED DESCRIPTION

Figure 1:
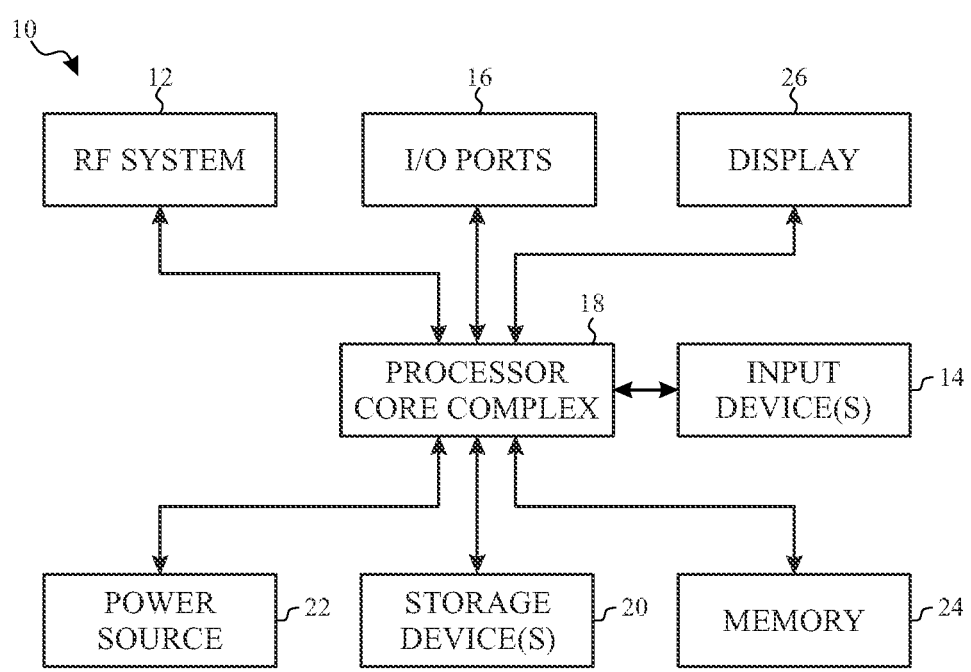
FIG. 1 is a block diagram of an electronic device including a radio frequency system, in accordance with an embodiment of the present disclosure.

One or more specific embodiments of the present disclosure will be described below. These described embodiments are only examples of the presently disclosed techniques. Additionally, in an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but may nevertheless be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features.

The present disclosure generally relates to radio frequency systems, which may be implemented in electronic devices to facilitate wireless communication. For example, a radio frequency system may facilitate wireless communication between electronic devices. Additionally or alternatively, a radio frequency system may facilitate wireless communication between an electronic device and a communication network, such as a Bluetooth network, a Wi-Fi network, and/or a cellular (e.g., LTE, 5G, or millimeter wave) network.

Different types of communication networks often utilize different communication protocols and/or different communication (e.g., transmission and/or reception) frequencies. For example, a Wi-Fi network may utilize communication frequencies, such as a 900 MHz band, a 2.4 GHz band, a 3.6 GHz band, a 4.9 GHz band, a 5 GHz band, a 5.9 GHz band, and/or a 60 GHz band. As a further example, a millimeter wave (mmWave) communication network may utilize communication frequencies, such as a 28 GHz band, a 38 GHz band, and/or a 60 GHz band.

Nevertheless, radio frequency systems generally include transceiver (e.g., transmitter and/or receiver) circuitry and at least one antenna coupled to the transceiver circuitry. As such, operation of radio frequency systems may be generally similar. For example, to wirelessly transmit a (e.g., data) packet, transceiver circuitry of a first radio frequency system may determine a digital representation of the packet as a first digital electrical signal. Based at least in part on the first digital electrical signal, the transceiver circuitry may generate an analog representation of the packet as a first analog electrical signal. An antenna coupled to the transceiver circuitry may then may modulate electromagnetic (e.g., radio) waves based at least in part on the first analog electrical signal, thereby wirelessly transmitting the packet from the first radio frequency system via an electromagnetic wave signal.

On the other end, an antenna may output analog electrical signals based at least in part on received (e.g., incident) electromagnetic (e.g., radio) waves. In other words, when an electromagnetic wave signal corresponding with the (e.g., data) packet is incident on an antenna of a second radio frequency system, the antenna may output an analog representation of the packet to transceiver circuitry of the second radio frequency as a second analog electrical signal. Based on the second analog electrical signal, the transceiver circuitry may generate a digital representation of the packet as a second digital electrical signal, thereby receiving the wirelessly transmitted packet.

However, an electromagnetic wave generally experiences some amount of loss as it propagates, for example, which reduces power of the electromagnetic wave proportionally with travel (e.g., propagation) distance squared. Moreover, electromagnetic waves may generally interact with each other, thereby producing additive interference and/or destructive interference. However, in normal operating scenarios, stray electromagnetic waves are generally present, for example, due at least in part to persistent emission of electromagnetic waves from the Sun. In other words, continuing with the above example, the electromagnetic wave signal transmitted from the first radio frequency system may differ from the electromagnetic wave signal received by the second radio frequency system, which, at least in some instances, may affect communication reliability, for example, due to propagation loss and/or stray electromagnetic waves causing the transmitted version of the packet to differ from the version determined by the second radio frequency system.

To facilitate improving communication reliability, a radio frequency system may include amplifier circuitry that operates to amplify analog electrical signals, for example, before the analog electrical signals are used to transmit corresponding electromagnetic waves and/or before the analog electrical signals are converted into corresponding digital electrical signals. During operation, the amplifier circuitry may apply a gain to an input analog electrical signal to produce an output analog electrical signal with increased magnitude. In particular, increasing gain (e.g., amount of amplification) applied to an analog electrical signal before transmission may increase magnitude (e.g., output power) of resulting electromagnetic waves. In other words, increasing gain applied in a transmitting radio frequency system may facilitate compensating for propagation loss resulting in an electromagnetic wave signal transmitted from the transmitting radio frequency system to a receiving radio frequency system, which, at least in some instances, may facilitate improving ability of the receiving radio frequency system to properly identify a transmitted (e.g., target or intended) packet from noise introduced by stray electromagnetic waves.

However, operating amplifier circuitry to amplify an analog electrical signal generally consumes electrical power. In fact, the amount of electrical power consumed generally increases as the gain (e.g., amount of amplification) applied to analog electrical signals increases. In other words, at least in some instances, increasing the gain applied in a radio frequency system may increase power consumption and, thus, affect (e.g., reduce) operational efficiency of the radio frequency system.

To facilitate improving operational efficiency and/or communication reliability, in some instances, a radio frequency system may include multiple antennas coupled to its transceiver circuitry. For example, a (e.g., beamformer) radio frequency system may include an array of multiple antennas to enable the radio frequency system to wirelessly transmit one or more data streams using beamforming (e.g., beam-steering) techniques. Additionally or alternatively, a (e.g., beamformee) radio frequency system may include an array of multiple antennas to enable the radio frequency system to receive multiple concurrently transmitted data streams.

However, the number of data streams that can be concurrently received by a beamformee radio frequency system and, thus, that can be concurrently transmitted from a beamformer radio frequency system is generally be limited by the number of antennas utilized by the target beamformee radio frequency system. For example, when the beamformee utilizes a single antenna, the beamformer radio frequency system may wirelessly transmit a single data stream using beamforming techniques. As a further example, when the beamformee utilizes three antennas, the beamformer radio frequency system may concurrently transmit up to three data streams.

To implement beamforming techniques, a beamformer radio frequency system may concurrently transmit electromagnetic wave signals from multiple antennas such that additive and/or destructive interference therebetween produces one or more electromagnetic wave beams (e.g., concentrated strength) oriented in a target direction, such as toward a target beamformee radio frequency system. In other words, concurrent transmission of electromagnetic wave signals from multiple antennas of the beamformer radio frequency system may effectively combine the analog electrical signals supplied to the antennas. As such, an analog electrical signal output from an antenna of a beamformee radio frequency system may be a (e.g., linear) combination of stray electromagnetic waves and the analog electrical signals supplied to the antennas of the beamformer radio frequency system reduced by propagation loss resulting therebetween.

In other words, orientation of an electromagnetic wave beam produced by a beamformer radio frequency system may be adjusted by adaptively controlling phase and/or magnitude of the analog electrical signals supplied to its antennas. As such, to facilitate implementing beamforming techniques, a radio frequency system may include coding circuitry that operates to process (e.g., encode) a packet before transmission and/or to process (e.g., decode) a packet received from another radio frequency system. For example, to facilitate wirelessly transmitting a data stream using beamforming techniques, coding circuitry in a beamformer radio frequency system may encode the data stream based at least in part on encoding parameters to produce multiple versions of an analog electrical signal corresponding with the data stream. In particular, based at least in part on the encoding parameters, the coding circuitry may process and/or route the data stream such that different versions, which have potentially differing magnitude and/or differing phase, are supplied to different antennas of the beamformer radio frequency system.

On the other side, to facilitate receiving a data stream wirelessly transmitted using beamforming techniques, coding circuitry in a beamformee radio frequency system may decode analog electrical signals output from one or more antennas and/or corresponding digital electrical signals based at least in part on decoding parameters. In particular, in some instances, the coding circuitry in the beamformee radio frequency system may reverse the encoding performed by the beamformer radio frequency system and the effects (e.g., combination and/or stray electromagnetic interference) of wireless transmission. In other words, based at least in part on the decoding parameters, the coding circuitry may adjust phase and/or magnitude of an analog electrical signal output from each antenna of the beamformee radio frequency system and/or corresponding digital electrical to facilitate identifying (e.g., separating out) one or more data streams, for example, from one another and/or from noise produced by stray electromagnetic waves.

As such, at least in some instances, coding (e.g., encoding and/or decoding) parameters to be applied by radio frequency systems to enable the radio frequency system to wirelessly communicate using beamforming techniques may be dependent at least in part on current communication conditions. For example, a set of communication conditions may include operational parameters of the radio frequency systems, such as the number of antennas utilized by a beamformer radio frequency system, the number of antennas utilized by a beamformee radio frequency system, location of the beamformee radio frequency system relative to the beamformer radio frequency system, the number of data streams to be concurrently transmitted, and/or one or more communication frequencies to be used to wirelessly transmit each data stream. In some instances, the set of communication conditions may additionally include parameters of a wireless communication channel used by the beamformer radio frequency system and the beamformee radio frequency system, such characteristics (e.g., location, type, reflection coefficient, and/or size) of obstructions and/or other environmental conditions present in the wireless communication channel.

However, communication conditions often vary, for example, due to a radio frequency system being moved and/or the radio frequency system communicating with different radio frequency systems at different times. To facilitate accounting for potential variations, in some instances, a target beamformee radio frequency system may determine current communication conditions, for example, based at least in part on distortion introduced on a beamforming initiation packet, such as a non-data packet (NDP), received from a beamformer radio frequency system. Additionally, based at least in part on the current communication conditions, the target beamformee radio frequency system may determine coding (e.g., encoding and/or decoding) parameters and return encoding (e.g., beamforming) parameters to the beamformer radio frequency system.

As described above, the beamformer radio frequency system may then process a data packet based at least in part on the encoding parameters to facilitate wirelessly transmitting the data packet via one or more electromagnetic wave beams. Additionally or alternatively, the beamformee radio frequency system may process analog electrical signals output from its antennas and/or corresponding digital electrical signals based at least in part on decoding parameters to facilitate identifying the data packet. In other words, at least in some instances, coding (e.g., encoding and/or decoding) parameters determined for different sets of communication conditions may affect operational efficiency and/or communication reliability of radio frequency systems, for example, due to encoding parameters resulting in an electromagnetic wave beam oriented in an improper direction and/or a beamformer radio frequency system re-transmitting dropped packets.

Accordingly, to facilitate improving operational efficiency and/or communication reliability of radio frequency systems, the present disclosure provides techniques for implementing and/or operating a testing system to facilitate calibrating and/or testing a radio frequency system under various sets of communication conditions, for example, before commercial deployment of the radio frequency system and/or an electronic device including the radio frequency system. In some instances, a radio frequency system may be calibrated and/or tested by physically reproducing communication conditions and operating the radio frequency within the physically reproduced communication conditions. However, physically reproducing communication conditions is often a complex and/or time consuming process, which, at least in some instances, may limit calibration efficiency and/or testing efficiency of radio frequency systems, for example, due to a wireless communication channel being physically reproduced using heavy equipment and/or an anechoic room.

To facilitate improving calibration and/or testing efficiency, in some embodiments, a testing system may include a tester radio frequency system implemented and/or operated to emulate wireless communication, for example, on-chip. In some embodiments, a tester radio frequency system may emulate wireless communication by emulating the effect that transmission of a packet via a wireless communication channel is expected to have on the packet. In other words, before transmitting a packet, the tester radio frequency system may modify magnitude and/or phase of one or more electrical signals corresponding with the packet based at least in part on distortion expected to be introduced due to wireless transmission of the packet, for example, via its coding circuitry.

In fact, in some embodiments, emulating wireless communication in this manner may enable calibration and/or testing of another (e.g., device under testing (DUT)) radio frequency system via one or more wired connections. For example, a testee radio frequency system may be wired to the tester radio frequency system in the testing system. In some embodiments, the tester radio frequency system and the testee radio frequency system may be wired in a manner that bypasses their antennas, for example, such that transceiver circuitry of the tester radio frequency system is wired directly to transceiver circuitry of the testee radio frequency system. In other words, an analog electrical signal received by the testee radio frequency system may emulate transmission of one or more corresponding packets from the tester radio frequency system to the testee radio frequency system via a wireless communication channel.

As such, during a testing (e.g., calibration) process, a tester radio frequency system may operate similarly to a beamformer radio frequency system and a testee radio frequency system may operate similarly to a beamformee radio frequency. For example, as described above, a beamformer radio frequency system may broadcast a beamforming initiation packet from each of its antennas. However, during the testing process, the tester radio frequency system may additionally process the beamforming initiation packet based on encoding parameters, which emulate the effect of communication conditions currently being tested, and output analog electrical signals indicative of the encoded packet to the testee radio frequency system via one or more wired connections.

In some embodiments, an original version of the beamforming initiation packet may be pre-determined and stored in a beamformee radio frequency system and/or a testee radio frequency system. In other words, based on analog electrical signals supplied to its transceiver circuitry, a receiving (e.g., beamformee or testee) radio frequency system may determine a received version of the beamforming initiation packet and compare the received version with the original version to determine distortion introduced by transmission of the beamforming initiation packet. Moreover, when utilizing multiple antennas, the receiving radio frequency system may determine multiple versions of the beamforming initiation packet and compare different versions to determine relative differences in introduced distortion. Based at least in part on the introduced distortion, the receiving radio frequency system may determine communication conditions under which the beamforming initiation packet was transmitted and determine coding (e.g., encoding and/or decoding) parameters accordingly, for example, by selecting a set of coding parameters associated with communication conditions by its current configuration.

As described above, in some embodiments, a set of communication conditions may include operational parameters of a beamformer radio frequency system, operational parameters of a beamformee radio frequency system, and/or parameters of a wireless communication channel used by the beamformer radio frequency system and the beamformee radio frequency system. To facilitate improving operational efficiency, in some embodiments, a receiving (e.g., beamformee or testee) radio frequency system may indirectly determine a set of communication conditions by determining phase and/or magnitude relationships between each antenna of a transmitting (e.g., beamformer or tester) radio frequency system and each antenna of the receiving radio frequency system. For example, when the transmitting radio frequency system utilizes eight antennas and the receiving radio frequency system utilizes three antennas, the receiving radio frequency system may determine a current set of communication conditions as an 8×3 communication condition matrix.

Additionally, as described above, a beamformee radio frequency may determine coding (e.g., encoding and/or decoding) parameters to be applied to subsequent data packets to account (e.g., compensate) for current communication conditions. For example, when a transmitting (e.g., beamformer or tester) radio frequency system utilizes eight antennas and a receiving (e.g., beamformee or testee) utilizes three antennas, the receiving radio frequency system may determine the set of encoding parameters to be used by the transmitting radio frequency system as 3×8 encoding matrix. Additionally, the receiving radio frequency system may determine the set of decoding parameters to be used by the receiving radio frequency system as 3×3 decoding matrix, for example, which is the inverse of a matrix resulting from combination (e.g., matrix multiplication) of the 3×8 encoding matrix and an 8×3 communication condition matrix.

Furthermore, as described above, a beamformee radio frequency system may return encoding (e.g., beamforming) parameters associated with current communication conditions to a beamformer radio frequency system. In this manner, as described above, the beamformer radio frequency system may process subsequent data packets based on the encoding parameters received from the beamformee radio frequency system to facilitate wirelessly transmitting the data packets via one or more electromagnetic wave beams. During normal operation, the beamformee radio frequency system may wirelessly transmit the encoding parameters to the beamformer radio frequency system.

On the other hand, during the testing process, in some embodiments, a testee radio frequency system may return the encoding parameters to a tester radio frequency system via one or more wired connections. Based at least in part on the returned encoding parameters, the tester radio frequency system may process a subsequent data packet and output analog electrical signals indicative of the encoded packet to the testee radio frequency system via one or more wired connections. However, as described above, the tester radio frequency system may also utilize encoding parameters, which emulate the effect of communication conditions currently being tested.

In other words, during the testing process, the encoding parameters applied by the tester radio frequency system may include channel emulation parameters and/or beamforming parameters. In particular, the tester radio frequency system may process a beamforming initiation packet based on the channel emulation parameters, for example, along with default (e.g., uniform gain and/or uniform phase shift) beamforming parameters. On the other hand, the tester radio frequency system may process subsequent data packets based on the channel emulation parameters as well as updated (e.g., non-default) beamforming parameters returned from the tested radio frequency system.

In some embodiments, an original version of a data packet to be transmitted during the testing process may be predetermined and stored in the testing system. Accordingly, based on analog electrical signals supplied to transceiver circuitry of the testee radio frequency system, the testing system may determine a received version of the data packet and compare the received version with the original version to facilitate evaluating performance of the testee radio frequency system as a beamformee. For example, the testing system may compare the received version with the original version to determine a packet error rate resulting from use of the set of beamforming parameters previously returned to the tester radio frequency system.

To facilitate improving performance as a beamformee, in some embodiments, the testing system may adaptively adjust configuration (e.g., programming and/or implementation) of a testee radio frequency system during the testing (e.g., calibration) process. For example, the testing system may adjust a current configuration of the testee radio frequency system such that the testee radio frequency system determines a different set of beamforming parameters if communication conditions are subsequently detected again. Additionally, in some embodiments, the testing system may adjust the current configuration of the testee radio frequency system when use of the previously returned set of beamforming parameters result in a packet error rate greater than an error threshold. In fact, in some embodiments, operation (e.g., performance) of the testee radio frequency system under different sets of communication conditions may be tested and/or calibrated merely be adjusting the channel emulation parameters applied by the tester radio frequency system. In this manner, as will be described in more detail below, the techniques described in the present disclosure may facilitate improving calibration efficiency and/or testing efficiency of a radio frequency system and, thus, an electronic device in which the radio frequency system is deployed, for example, by obviating wireless communication and, thus, physical reproduction of communication conditions during testing and/or calibration of the radio frequency system.

To help illustrate, an example of an electronic device 10, which includes a radio frequency system 12, is shown in FIG. 1. As will be described in more detail below, the electronic device 10 may be any suitable electronic device, such as a computer, a mobile (e.g., portable) phone, a portable media device, a tablet device, a television, a handheld game platform, a personal data organizer, a virtual-reality headset, a mixed-reality headset, a vehicle dashboard, and/or the like. Thus, it should be noted that FIG. 1 is merely one example of a particular implementation and is intended to illustrate the types of components that may be present in an electronic device 10.

As depicted, in addition to the radio frequency system 12, the electronic device 10 includes one or more input devices 14, one or more input/output ports 16, a processor core complex 18, one or more storage devices 20, a power source 22, memory 24, and an electronic display 26. The various components described in FIG. 1 may include hardware elements (e.g., circuitry), software elements (e.g., a tangible, non-transitory computer-readable medium storing instructions), or a combination of both hardware and software elements. It should be noted that the various depicted components may be combined into fewer components or separated into additional components. For example, the memory 24 and a storage device 20 may be included in a single memory or storage component.

As depicted, the processor core complex 18 is operably coupled with memory 24 and the storage device 20. In this manner, the processor core complex 18 may execute instruction stored in memory 24 and/or the storage device 20 to perform operations, such as instructing the radio frequency system 12 to communicate with another electronic device and/or a communication network. As such, the processor core complex 18 may include one or more general purpose microprocessors, one or more application specific processors (ASICs), one or more field programmable logic arrays (FPGAs), or any combination thereof.

In addition to instructions, the memory 24 and/or the storage device 20 may store data to be processed by the processor core complex 18. Thus, in some embodiments, the local memory and/or the storage device 20 may include one or more tangible, non-transitory, computer-readable mediums. For example, the memory 24 may include random access memory (RAM) and the storage device 20 may include read only memory (ROM), rewritable non-volatile memory, such as flash memory, a hard drive, an optical disc, and/or the like.

As depicted, the processor core complex 18 is also operably coupled with the I/O ports 16. In some embodiments, the I/O ports 16 may enable the electronic device 10 to interface with other electronic devices. For example, a portable storage device may be connected to an I/O port 16, thereby enabling the processor core complex 18 to communicate with the portable storage device.

Additionally, as depicted, the processor core complex 18 is operably coupled to the power source 22. In this manner, the power source 22 may provide electrical power to the processor core complex 18, for example, as well as one or more components in the electronic device 10, such as the radio frequency system 12. Thus, the power source 22 may include any suitable energy source, such as a rechargeable lithium polymer (Li-poly) battery and/or an alternating current (AC) power converter.

Furthermore, as depicted, the processor core complex 18 is operably coupled with the input devices 14. In some embodiments, an input device 14 may facilitate user interaction with the electronic device 10, for example, by receiving user inputs and communicating the user inputs to the processor core complex 18. Thus, in some embodiments, the input devices 14 may include a button, a keyboard, a mouse, a trackpad, and/or the like. Additionally, in some embodiments, the input devices 14 may include touch sensing components implemented in the electronic display 26. In such embodiments, the touch sensing components may receive user inputs by detecting occurrence and/or position of an object contacting the surface of the electronic display 26.

In addition to enabling user inputs, the electronic display 26 may display images, such as a graphical user interface (GUI) for an operating system, an application interface, a still image, or video content. As depicted, the electronic display 26 is operably coupled to the processor core complex 18. As such, in some embodiments, the electronic display 26 may display images based at least in part on image data received from the processor core complex 18.

As depicted, the processor core complex 18 is also operably coupled with the radio frequency system 12. As described above, the radio frequency system 12 may facilitate wirelessly communication with another electronic device and/or a communication network. For example, the radio frequency system 12 may enable the electronic device 10 to communicate with a personal area network (PAN), such as a Bluetooth network, a local area network (LAN), such as an 802.11x Wi-Fi network, and/or a wide area network (WAN), such as an LTE or a millimeter wave (mmWave) cellular network. In other words, the radio frequency system 12 may enable wirelessly communicating data using various communication protocols.

Even when using different communication protocols and/or different communication frequencies, operational principles of radio frequency systems 12 may generally be similar. For example, the radio frequency system 12 may convert a digital electrical signal, which digitally represents a (e.g., data) packet to be transmitted, into an analog electrical signal, thereby generating an analog representation of the packet. Additionally, the radio frequency system 12 may amplify the analog electrical signal to a target output power, thereby generating an amplified analog electrical signal, for example, after converting the analog electrical signal from a processing (e.g., intermediate or baseband) frequency to a target communication (e.g., transmission and/or reception) frequency. Based at least in part on the amplified analog electrical signal, the radio frequency system 12 may modulate electromagnetic waves at a radio frequency, thereby wirelessly transmitting the packet via an electromagnetic wave signal.

Additionally or alternatively, the radio frequency system 12 may generate an analog electrical signal modulated based at part on power of received (e.g., incident) electromagnetic waves, thereby indicating wirelessly received data via an analog electrical signal. Since received electromagnetic waves often include electromagnetic interference, the radio frequency system 12 may filter and/or amplify the analog electrical radio frequency signals. Furthermore, to facilitate subsequent processing, the radio frequency system 12 may convert the analog electrical signal from the communication (e.g., transmission and/or reception) frequency to a processing (e.g., intermediate or baseband) frequency and/or to a digital electrical signal. Due to similarities in operational principles, the techniques described herein may be applicable to any suitable radio frequency system 12 regardless of communication protocol or communication frequency.

Figure 2:
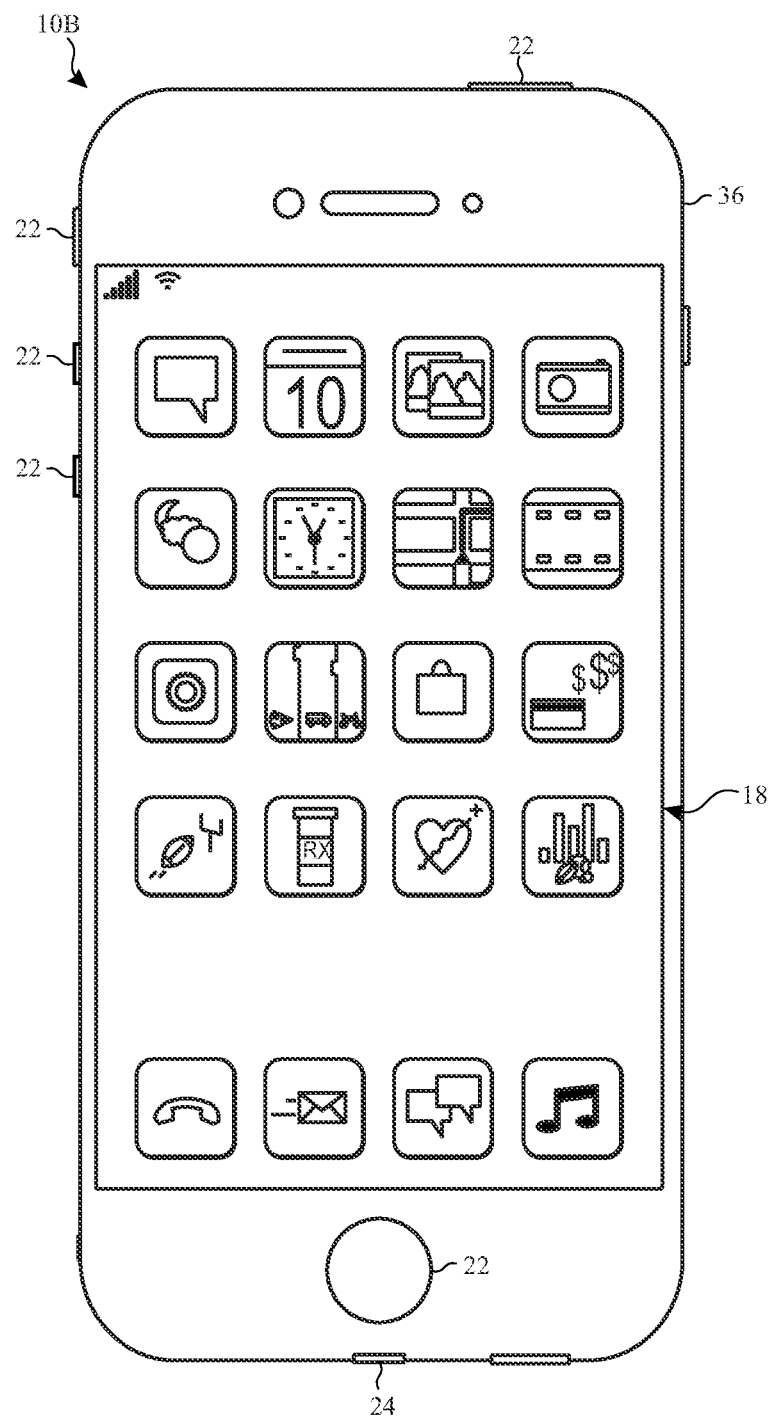
FIG. 2 is an example of the electronic device of FIG. 1, in accordance with an embodiment; of the present disclosure

As described above, the electronic device 10 may be any suitable electronic device. To help illustrate, one example of a suitable electronic device 10, specifically a handheld electronic device 10A, is shown in FIG. 2. In some embodiments, the handheld electronic device 10A may be a portable phone, a media player, a personal data organizer, a handheld game platform, and/or the like. For example, the handheld electronic device 10A may be a smart phone, such as any iPhone® model available from Apple Inc.

As depicted, the handheld electronic device 10A includes an enclosure 28 (e.g., housing). In some embodiments, the enclosure 28 may protect interior components from physical damage and/or shield them from electromagnetic interference. Thus, a radio frequency system 12 may also be enclosed within the enclosure 28 and internal to the handheld electronic device 10A.

Additionally, as depicted, the enclosure 28 may surround the electronic display 26. In the depicted embodiment, the electronic display 26 is displaying a graphical user interface (GUI) 29 having an array of icons. By way of example, when an icon is selected be a user input received via an input device 14 or a touch sensing component of the electronic display 26, an application program may launch.

Furthermore, as depicted, input devices 14 open through the enclosure 28. As described above, the input devices 14 may enable a user to interact with the handheld electronic device 10A. For example, the input devices 14 may enable the user to activate or deactivate the handheld electronic device 10A, navigate a user interface to a home screen, navigate a user interface to a user-configurable application screen, activate a voice-recognition feature, provide volume control, and/or toggle between vibrate and ring modes. As depicted, the I/O ports 16 also open through the enclosure 28. In some embodiments, the I/O ports 16 may include, for example, an audio jack to connect to external devices.

Figure 3:
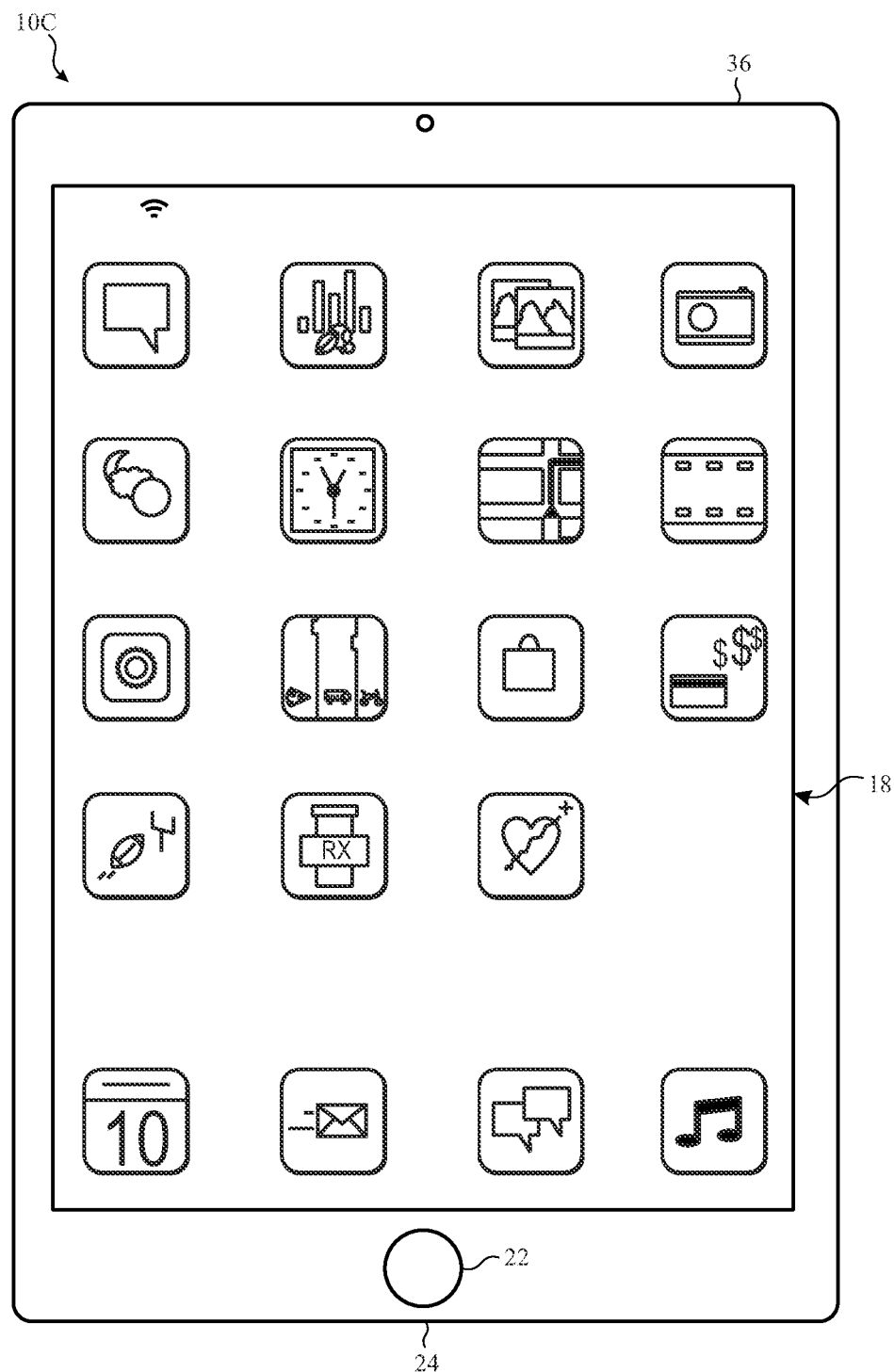
FIG. 3 is another example of the electronic device of FIG. 1, in accordance with an embodiment of the present disclosure.
Figure 4:
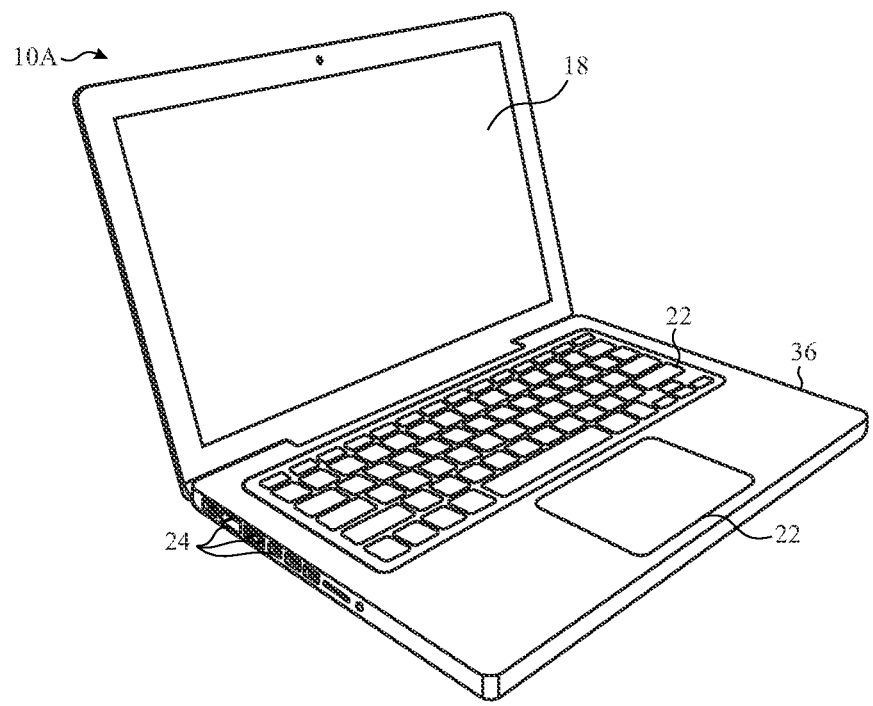
FIG. 4 is another example of the electronic device of FIG. 1, in accordance with an embodiment of the present disclosure.
Figure 5:
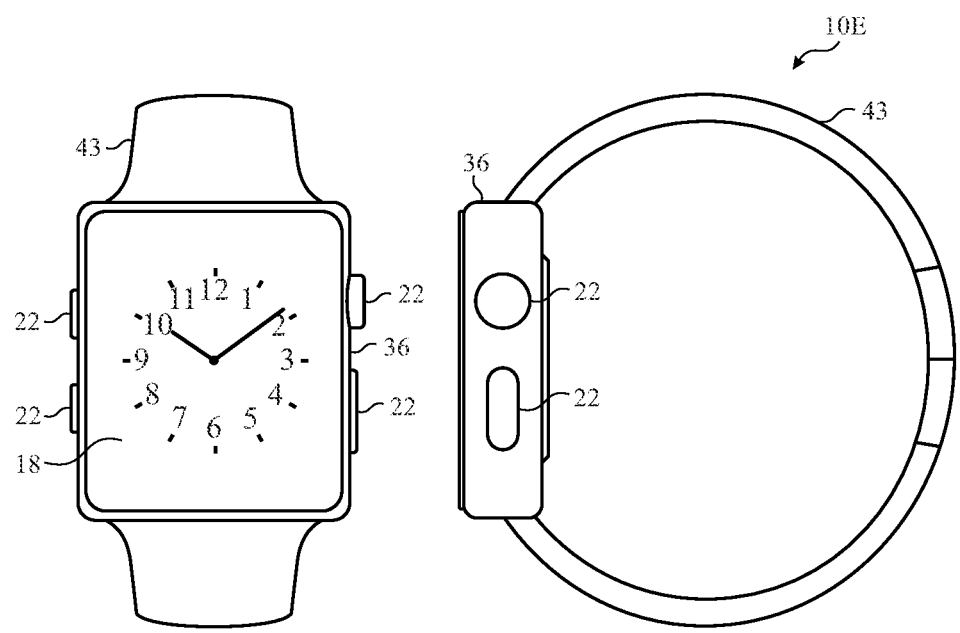
FIG. 5 is another example of the electronic device of FIG. 1, in accordance with an embodiment of the present disclosure.

To help further illustrate, another example of a suitable electronic device 10, specifically a tablet electronic device 10B is shown in FIG. 3. As an illustrative example, the tablet electronic device 10B may be any iPad® model available from Apple Inc. A further example of a suitable electronic device 10, specifically a computer 10C, is shown in FIG. 4. As an illustrative example, the computer 10C may be any MacBook® or iMac® model available from Apple Inc. Another example of a suitable electronic device 10, specifically a watch 10D, is shown in FIG. 5. As an illustrative example, the watch 10D may be any Apple Watch® model available from Apple Inc.

As depicted, the tablet electronic device 10B, the computer 10C, and the watch 10D each also include an electronic display 26, input devices 14, I/O ports 16, and an enclosure 28. Thus, in some embodiments, the enclosure 28 may enclose a radio frequency system 12 in the tablet electronic device 10B, the computer 10C, and/or the watch 10D. In any case, as described above, a radio frequency system 12 may facilitate wirelessly communication with other electronic devices 10 and/or a communication network.

Figure 6:
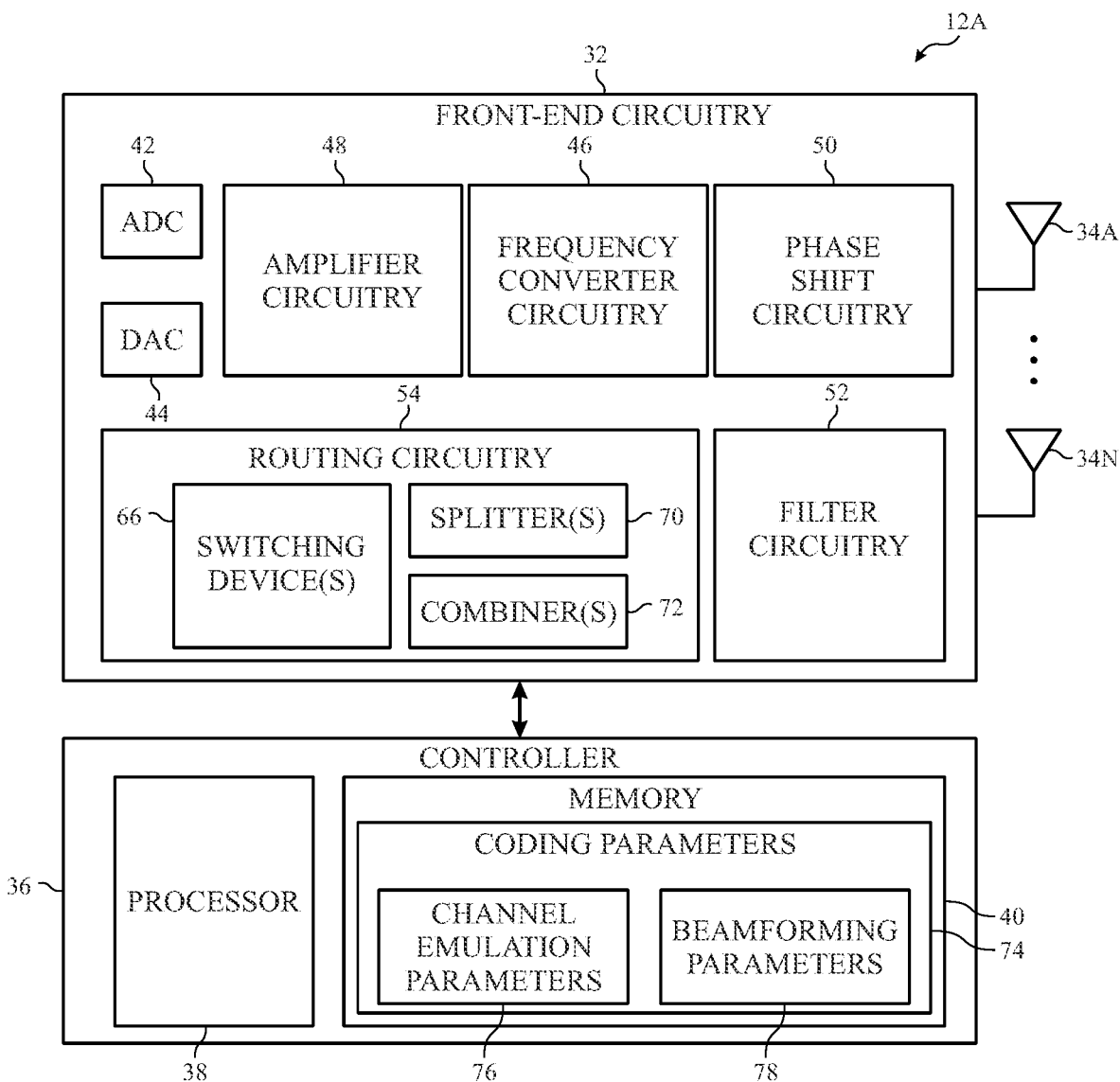
FIG. 6 is block diagram of an example of the radio frequency system of FIG. 1, in accordance with an embodiment of the present disclosure.

To help illustrate, an example of a radio frequency system 12, which may be implemented (e.g., deployed) in an electronic device 10, is shown in FIG. 6. As depicted, the radio frequency system 12 includes transceiver circuitry 32, antennas 34, and a controller 36. It should be appreciated that the depicted example is merely intended to be illustrative and not limiting. For example, in other embodiments, a radio frequency system 12 may include a single antenna 34 or more than two antennas 34.

To enable an electronic device 10 to wirelessly communicate via the radio frequency system 12, in some embodiments, its processor core complex 18 and/or other digital processing circuitry may be communicatively coupled to the transceiver circuitry 32 of the radio frequency system 12. Generally, digital processing circuitry may process data and/or other types of packets in a digital domain. In other words, digital processing circuitry may process data and/or other types of packets indicated via digital electrical signals, for example, which indicate "0" bits when voltage is below a voltage threshold and "1" bits when voltage is above the voltage threshold.

On the other end, as depicted, the transceiver circuitry 32 is coupled to multiple antennas 34—including at least a first antenna 34A and an Nth antenna 34N. However, an antenna 34 generally operates in an analog domain. For example, an antenna 34 may facilitate wireless transmission by modulating electromagnetic (e.g., radio) waves based at least in part on an analog electrical signal received from the transceiver circuitry 32. Additionally or alternatively, an antenna 34 may facilitate reception of wireless transmissions by outputting an analog electrical signal based at least in part on received (e.g., incident) electromagnetic waves. In other words, the transceiver circuitry 32 may act as an interface between the digital domain (e.g., used by digital processing circuitry) and the analog domain (e.g., used by an antenna 34 and/or analog processing circuitry).

To facilitate interfacing the digital domain and the analog domain, as in the depicted example, the transceiver circuitry 32 may include an analog-to-digital converter (ADC) 42 and/or a digital-to-analog converter (DAC) 44. Generally, the analog-to-digital converter (ADC) 42 may operate to convert an analog electrical signal (e.g., output from an antenna 34) into a digital electrical signal (e.g., to be output to the digital processing circuitry 30). On the other hand, the digital-to-analog converter (DAC) 44 may generally operate to convert a digital electrical signal (e.g., output from digital processing circuitry) into an analog electrical signal (e.g., to be output to an antenna 34).

In addition to converting between the digital domain and the analog domain, the transceiver circuitry 32 may include processing circuitry that operates to process electrical signals corresponding with packets to be transmitted from the radio frequency system 12 and/or packets received by the radio frequency system 12. In some embodiments, the transceiver circuitry 32 may process the electrical signals at least in part in the digital domain and, thus, may include digital processing circuitry, for example, including a modem, a baseband processor, and/or the like. Additionally or alternatively, the transceiver circuitry 32 may process the electrical signals at least in part in the analog domain and, thus, may include analog processing (e.g., front-end) circuitry.

Merely as an illustrative example, processing circuitry implemented in the transceiver circuitry 32 may include frequency converter circuitry 46, amplifier circuitry 48, phase shift circuitry 50, and/or filter circuitry 52. Generally, the filter circuitry 52 may operate to remove noise from an electrical signal, for example, by attenuating frequencies outside a target communication frequency or band. Thus, in some embodiments, the filter circuitry 52 may include one or more bandpass filters. Additionally, in some embodiments, operation of the filter circuitry 52 may be controlled based at least in part on filter parameters, such as one or more target communication frequencies and/or one or more target filter strengths.

Furthermore, the amplifier circuitry 48 may generally operate to amplify magnitude (e.g., amplitude) of electrical signals, for example, to facilitate compensating for propagation loss. In some embodiments, the amplifier circuitry 48 may include one or more transmit (e.g., power) amplifiers, which operate to amplify electrical signals to be supplied to the antennas 34. Additionally or alternatively, the amplifier circuitry 48 may include one or more receipt (e.g., low noise) amplifier, which operate to amplify electrical signals output from the antennas 34. Furthermore, in some embodiments, operation of the amplifier circuitry 48 may be controlled based at least in part on amplifier parameters, such as a one or more target gain values (e.g., amount of amplification).

Additionally, the frequency converter circuitry 46 may generally operate to convert electrical signals between different frequencies. For example, the frequency converter circuitry 46 may convert between a processing (e.g., baseband) frequency used by digital processing circuitry and a communication (e.g., carrier) frequency used by an antenna 34. Additionally or alternatively, first frequency converter circuitry 46 may convert between the processing frequency and an intermediate frequency, which is between the processing frequency and the communication frequency, while second frequency converter circuitry 46 converts between the intermediate frequency and the communication frequency. Furthermore, in some embodiments, operation of the frequency converter circuitry 46 may be controlled based at least in part on frequency converter parameters, such as one or more target output frequencies.

Moreover, the phase shift circuitry 50 may generally operate to phase shift electrical signals, for example, to facilitate implementing beamforming techniques. Thus, in some embodiments, the phase shift circuitry 50 may include delay circuitry, for example, which operates to delay a first version of an electrical signal to be supplied to the first antenna 34A relative to a second version of the electrical signal to be supplied to the Nth antenna 34N. Additionally, in some embodiments, operation of the phase shift circuitry 50 may be controlled based at least in part on phase shift parameters, such as one or more target phase shifts.

In other words, in some embodiments, operation of processing circuitry implemented in the transceiver circuitry 32 may be controlled based at least in part on processing parameters, for example, including one or more filter parameters, one or more amplifier parameters, one or more frequency converter parameters, and/or one or more phase shift parameters. In fact, in some embodiments, operation of the processing circuitry may be adaptively adjusted based at least in part on current communication conditions, for example, to facilitate balancing operational efficiency (e.g., power consumption) and communication reliability (e.g., transmission distance) and/or to facilitate implementing beamforming techniques.

To facilitate adaptively adjusting operation of its processing circuitry, as in the depicted example, the transceiver circuitry 32 may include routing circuitry 54. Generally, routing circuitry 54 may operate to route electrical signals to appropriate destinations in the radio frequency system 12, for example, between different portions of the processing circuitry and/or between the processing circuitry and the antennas 34. As in the depicted example, the routing circuitry 54 may include one or more switching devices 66. In some embodiments, one or more of the switching devices 66 may be implemented in a multiplexer or a de-multiplexer. Additionally, in some embodiments, the switching devices 66 may include a time division duplex (TDD) switch, for example, which selectively switches between a transmission (e.g., uplink) state and a reception (e.g., downlink) state. Furthermore, in some embodiments, one or more of the switching devices 66 may be a semiconductor switching device, such as a metal-oxide-semiconductor field-effect transistor (MOSFET).

Additionally, as in the depicted example, the routing circuitry 54 may include one or more splitters 70 and/or one or more combiners 72. Generally, a splitter 70 may operate to supply the same electrical signal to multiple different destinations. On the other hand, a combiner 72 may generally operate to combine electrical signals received from multiple different sources into a single electrical signal, for example, which includes multiple different frequency components and/or multiple data streams.

In fact, in some embodiments, including splitters 70 and/or combiners 72 in the routing circuitry 54 may facilitate implementing beamforming techniques. As an illustrative example, in a transmitting (e.g., beamformer) radio frequency system 12, a splitter 70 may operate to output the same version of an electrical signal corresponding with a data stream to multiple different destinations, for example, different portions of the amplifier circuitry 48 operated to apply different gain values and/or different portions of the phase shift circuitry 50 operated to apply different phase shifts. Additionally, to concurrently transmit multiple data streams, a combiner 72 in the transmitting radio frequency system 12 may combine electrical signals corresponding with multiple different data streams into a single electrical signal, which is output to a single destination, such as antenna 34 or subsequent processing circuitry.

On the other hand, when a receiving (e.g., beamformee) radio frequency system 12 utilizes multiple antennas 34, a combiner 72 in the receiving radio frequency system 12 may combine electrical signals corresponding with analog electrical signals output from each of the antennas 34, for example, after processing by the frequency converter circuitry 46, the amplifier circuitry 48, the phase shift circuitry 50, and/or the filter circuitry 52. Additionally, to receive multiple concurrently transmitted data streams, a splitter 70 in the receiving radio frequency system 12 may operate to output the same version of an electrical signal corresponding with an analog electrical signal output from an antenna 34 to multiple different destinations, for example, different portions of filter circuitry 52 operated to target different communication frequencies. As such, in some embodiments, operation of the routing circuitry 54 may be controlled based at least in part on routing parameters, such as one or more target switching device states and/or one or more target routing paths (e.g., target source and/or target destination).

In some embodiments, the controller 36 may generally control operation of the radio frequency system 12. Although depicted as a single controller 36, in other embodiments, one or more separate controllers 36 may be used to control operation of a radio frequency system 12. To facilitate controlling operation, the controller 36 may include at least one controller processor 38 and/or controller memory 40. In some embodiments, the controller processor 38 may execute instructions and/or process data stored in the controller memory 40 to determine one or more control commands that instruct processing circuitry and/or routing circuitry 54 in the radio frequency system 12 to perform a control action. Additionally or alternatively, the controller processor 38 may be hardwired with instructions that determine control commands when executed. Furthermore, in some embodiments, the controller processor 38 may be included in the processor core complex 18 and/or separate processing circuitry.

Additionally, in some embodiments, the controller memory 40 may be included in memory 24, a storage device 20, and/or another tangible, non-transitory computer-readable medium. Furthermore, as in the depicted example, the controller memory 40 may store coding parameters 74, for example, including channel emulation parameters 76 and/or beamforming parameters 78. In some embodiments, the coding parameters 74 (e.g., channel emulation parameters 76 and/or beamforming parameters 78) may include processing parameters and/or routing parameters to be implemented by the transceiver circuitry 32.

Furthermore, in some embodiments, different sets of coding parameters 74 may be determined for different sets of communication conditions. For example, before transmission of a data packet, the radio frequency system 12 may operate on the packet based at least in part on coding (e.g., encoding) parameters 74 associated with a current set of communication conditions. Additionally or alternatively, the radio frequency system 12 may operate on a received data packet based at least in part on coding (e.g., decoding) parameters 74 associated with a current set of communication conditions. In this manner, as will be described in more detail below, a radio frequency system 12 may be implemented in an electronic device 10 to wirelessly communicate using a wireless communication channel, for example, using beamforming techniques.

Figure 7:
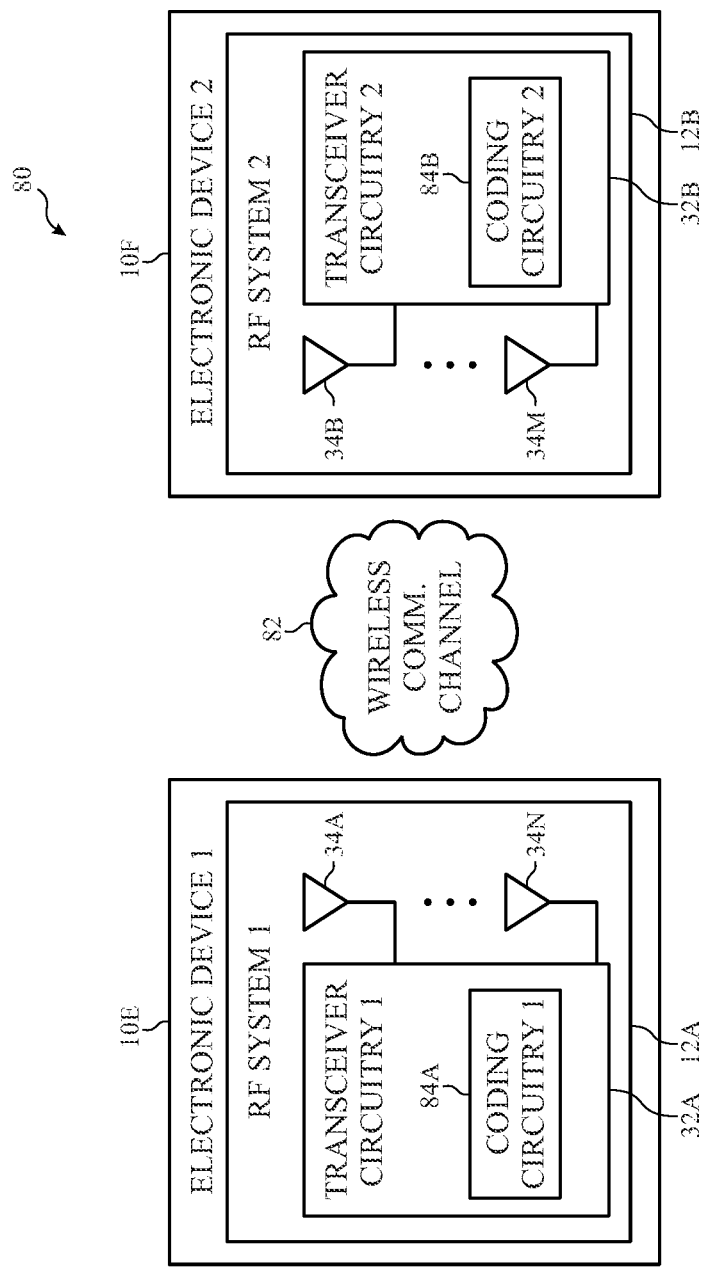
FIG. 7 is a block diagram of an example of a wireless communication system including a transmitting (e.g., beamformer) radio frequency system and a receiving (e.g., beamformee) radio frequency system, in accordance with an embodiment of the present disclosure.

To help illustrate, an example of a wireless communication system 80, which includes a first electronic device 10E and a second electronic device 10F communicatively coupled via a wireless communication channel 82, is shown in FIG. 7. It should be appreciated that the depicted example is merely intended to be illustrative and not limiting. For example, in other embodiments, the wireless communication system 80 may additionally include another electronic device 10 communicatively coupled to the first electronic device 10E and/or the second electronic device 10F via the wireless communication channel 82.

To enable wireless communication, as depicted, the first electronic device 10E includes a first radio frequency system 12A and the second electronic device 10F includes a second radio frequency system 12B. Additionally, as described above, a radio frequency system 12 may include transceiver circuitry 32 and one or more antennas 34. In particular, as depicted, the first radio frequency system 12A includes first transceiver circuitry 32A and multiple antennas 34—including at least a first antenna 34A and an Nth antenna 34N—each coupled to the first transceiver circuitry 32A. Additionally, as depicted, the second radio frequency system 12B includes second transceiver circuitry 32B and multiple antennas 34—including at least a second antenna 34B and an Mth antenna 34M—each coupled to the second transceiver circuitry 32B.

Furthermore, as described above, transceiver circuitry 32 may route and/or process electrical signals based at least in part on coding parameters 74. Thus, in some embodiments, coding circuitry 84 that operates based at least in part on the coding parameters 74 may be implemented in the transceiver circuitry 32. In particular, as depicted, the first transceiver circuitry 32A includes first coding circuitry 84A and the second transceiver circuitry 32B includes second coding circuitry 84B.

As described above, in some embodiments, coding parameters 74 may including routing parameters and/or processing parameters, for example, including one or more filter parameters, one or more amplifier parameters, one or more frequency converter parameters, and/or one or more phase shift parameters. Thus, in some embodiments, the first coding circuitry 84A may include frequency converter circuitry 46, amplifier circuitry 48, phase shift circuitry 50, filter circuitry 52, and/or routing circuitry 54 implemented in the first transceiver circuitry 32A. Additionally, in some embodiments, the second coding circuitry 84B may include frequency converter circuitry 46, amplifier circuitry 48, phase shift circuitry 50, filter circuitry 52, and/or routing circuitry 54 implemented in the second transceiver circuitry 32B.

Moreover, as described above, in some embodiments, coding parameters 74 may include beamforming parameters 78. In other words, in some embodiments, coding circuitry 84 may route and/or process a (e.g., data) packet based at least in part on beamforming parameters 78 to facilitate wirelessly transmitting the packet via one or more electromagnetic wave beams. As such, in some embodiments, one of the first radio frequency system 12A and the second radio frequency system 12B may act as a beamformer while the other acts as a beamformee.

Figure 8:
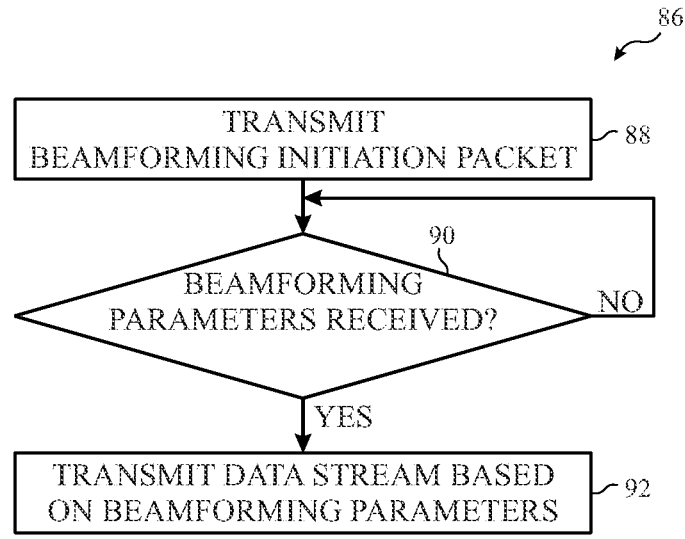
FIG. 8 is a flow diagram of an example process for operating the transmitting radio frequency system of FIG. 7, in accordance with an embodiment of the present disclosure.
Figure 9:
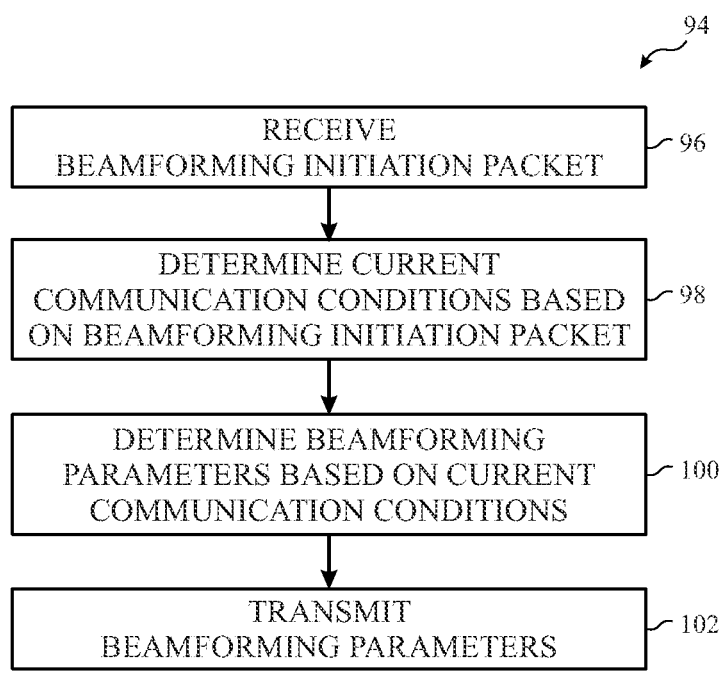
FIG. 9 is a flow diagram of an example process for operating the receiving radio frequency system of FIG. 7, in accordance with an embodiment of the present disclosure.
Figure 10:
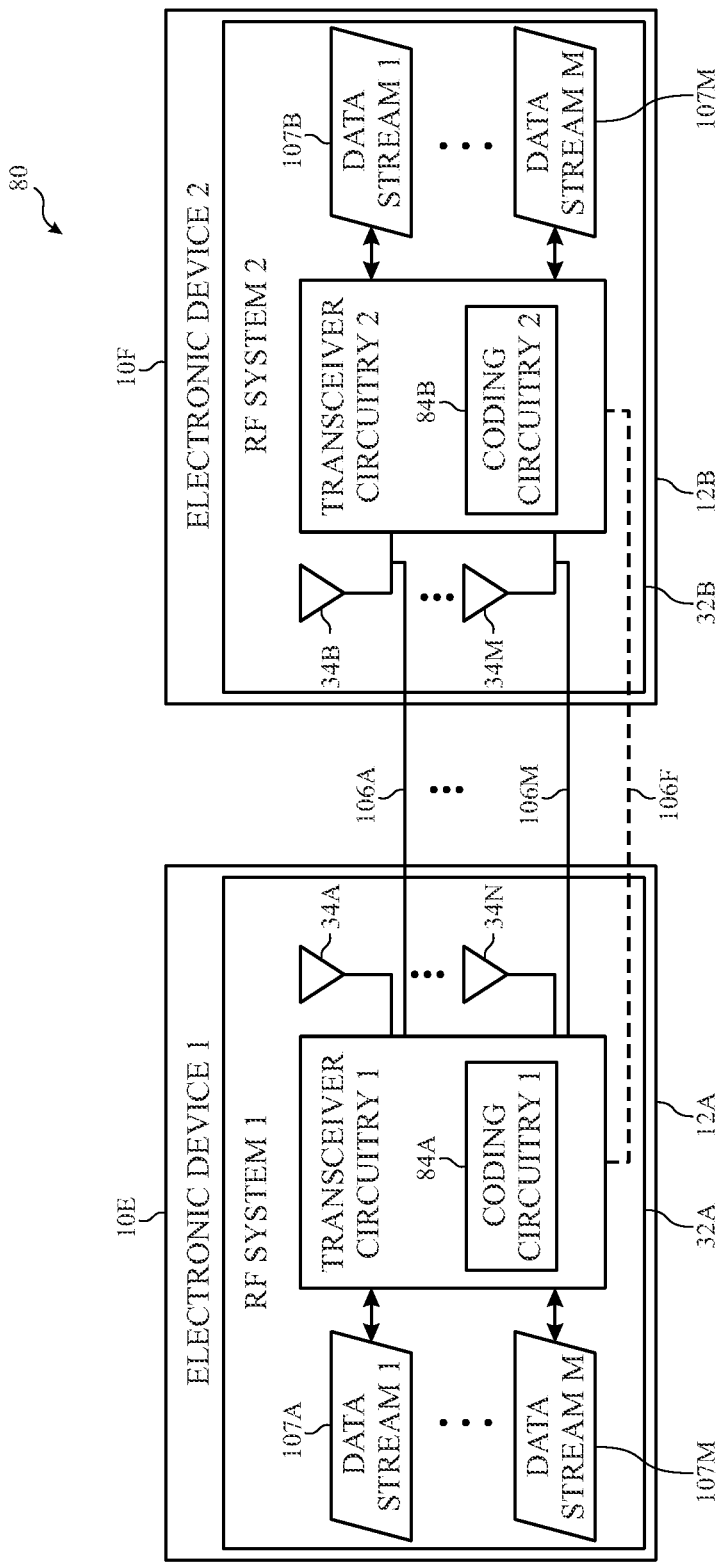
FIG. 10 is block diagram of a testing system including a transmitting (e.g., tester) radio frequency system and a receiving (e.g., testee) radio frequency system, in accordance with an embodiment of the present disclosure.

To help illustrate, an example of a process 86 for operating a transmitting (e.g., beamformer or tester) radio frequency system 12 is described in FIG. 8 and an example of a process 94 for operating a receiving (e.g., beamformee or testee) radio frequency system 12 is described in FIG. 9. Generally, the process 86 for operating a transmitting radio frequency system 12 includes transmitting a beamforming initiation packet (process block 88) and determining whether beamforming parameters have been received (decision block 90). Additionally, after the beamforming parameters have been received, the process 86 includes transmitting a data stream based on the beamforming parameters (process block 92).

Although described in a particular order, which represents a particular embodiment, it should be noted that the process 86 may be performed in any suitable order. Additionally, embodiments of the process 86 may omit process blocks and/or include additional process blocks. Moreover, in some embodiments, the process 86 may be implemented at least in part by executing instructions stored in a tangible, non-transitory, computer-readable medium, such as controller memory 40, using processing circuitry, such as the controller processor 38.

Accordingly, in some embodiments, a controller 36 may instruct a transmitting (e.g., beamformer or tester) radio frequency system 12 to transmit a beamforming initiation packet, for example, by switching a time division duplex (TDD) switching device 66 to its transmission state and/or supplying the beamforming initiation packet to transceiver circuitry 32 of the transmitting radio frequency system 12 (process block 88). During normal operation, in some embodiments, a beamformer radio frequency system 12 may wirelessly broadcast the beamforming initiation packet from each of its antennas 34. Thus, in some embodiments, the transmitting radio frequency system 12 may apply a default set of beamforming parameters 78 to the beamforming initiation packet, for example, which includes uniform gains and uniform phase shifts. Additionally, in some embodiments, the beamforming initiation packet may be a non-data (e.g., null-data) packet (NDP), for example, which only includes header metadata.

Furthermore, the transmitting radio frequency system 12 may determine whether a set of updated (e.g., non-default) beamforming parameters 78 has been received (decision block 90). As will be described in more detail below, in some embodiments, updated beamforming parameters 78 may be returned and/or fed back to the transmitting radio frequency system 12. In fact, in some embodiments, the set of updated beamforming parameters 78 may be determined based at least in part on distortion resulting from transmission of the beamforming initiation packet.

After the updated set of beamforming parameters 78 has been received, the transmitting radio frequency system 12 may transmit one or more data streams based at least in part on the updated set of beamforming parameters 78 (process block 92). For example, coding circuitry 84 in the transmitting radio frequency system 12 may vary gain and/or phase shift applied to a data packet based at least in part on the updated set of beamforming parameters 78. In other words, in some embodiments, the coding circuitry 84 may operate to produce multiple versions of a data stream, which when supplied to the antennas 34 of a beamformer radio frequency system 12 results in additive and/or destructive interference that produces one or more electromagnetic wave beams oriented in a target direction.

As described above, in some embodiments, a beamformer radio frequency system 12 may be operated to concurrently transmit multiple data streams. In such embodiments, the analog electrical signals supplied to the antennas 34 of the beamformer radio frequency system 12 may be a (e.g., linear and/or weighted) combination of the multiple data streams, for example, such that analog electrical signals supplied to different antennas 34 include different versions of the data streams. By operating in this manner, a beamformer radio frequency system 12 may wirelessly transmit one or more data streams to a beamformee radio frequency system 12 via one or more electromagnetic wave beams.

As described above, a process 94 for operating a receiving (e.g., beamformee or testee) radio frequency system 12 is described in FIG. 9. Generally, the process 94 includes receiving a beamforming initiation packet (process block 96) and determining current communication conditions based on the beamforming initiation packet (process block 98). Additionally, the process 94 includes determining beamforming parameters based on the current communication conditions (process block 100) and transmitting the beamforming parameters (process block 102).

Although described in a particular order, which represents a particular embodiment, it should be noted that the process 94 may be performed in any suitable order. Additionally, embodiments of the process 94 may omit process blocks and/or include additional process blocks. Moreover, in some embodiments, the process 94 may be implemented at least in part by executing instructions stored in a tangible, non-transitory, computer-readable medium, such as controller memory 40, using processing circuitry, such as the controller processor 38.

Accordingly, in some embodiments, a controller 36 may instruct a receiving (e.g., beamformee or testee) radio frequency system 12 to receive a beamforming initiation packet, for example, by switching a time division duplex (TDD) switching device 66 to its reception state (process block 96). In some embodiments, the receiving radio frequency system 12 may determine one or more received versions of the beamforming initiation packet based at least in part on analog electrical signals supplied to its transceiver circuitry 32. In fact, when utilizing multiple antennas 34, the receiving radio frequency system 12 may receive multiple versions of the beamforming initiation packet, for example, each corresponding with one of the antennas 34.

Based at least in part on the one or more received versions of the beamforming initiation packet, the receiving radio frequency system 12 may determine a set of current communication conditions (process block 98). Generally, a set of communication conditions includes one or more parameters that can potentially result in a transmitted version of a packet differing from a version determined by the receiving radio frequency system 12 and/or first received version of the packet differing from a second received version of the packet. Thus, in some embodiments, a set of communication conditions may include operational parameters of the radio frequency systems 12, such as the number of antennas utilized by a beamformer radio frequency system 12, the number of antennas utilized by a beamformee radio frequency system 12, location (e.g., distance and/or orientation) of the beamformee radio frequency system 12 relative to the beamformer radio frequency system 12, the number of data streams to be concurrently transmitted, and/or one or more communication frequencies to be used to wirelessly transmit each data stream. In some embodiments, the set of communication conditions may additionally include parameters of a wireless communication channel 82 used by the beamformer radio frequency system 12 and the beamformee radio frequency system 12, such as characteristics (e.g., location, type, reflection coefficient, and/or size) of obstructions and/or other environmental conditions present in the wireless communication channel 82.

Additionally, in some embodiments, an original version of the beamforming initiation packet may be pre-determined and stored in a tangible, non-transitory, computer-readable medium of the receiving radio frequency system 12, for example, in controller memory 40. In such embodiments, the receiving radio frequency system 12 may retrieve the original version of the beamforming initiation packet and compare it with one or more received versions of the beamforming initiation packet. In this manner, the receiving radio frequency system 12 may determine distortion introduced due to transmission of beamforming initiation and identify a set of communication conditions expected to result in the introduced distortion as the current communication conditions.

For example, in some embodiments, the receiving radio frequency system 12 may determine the number of antennas 34 being utilized by a transmitting radio frequency system 12 based on the number of times each of its antennas 34 receives the beamforming initiation packet. Additionally, in some embodiments, the number of antennas 34 being utilized by the receiving radio frequency system 12 may be determined based on the number of analog electrical signals supplied to its transceiver circuitry 32. Furthermore, in some embodiments, the receiving radio frequency system 12 may determine its relative location and/or obstruction characteristics based at least in part on distortion introduced relative to the original version of the beamforming initiation packet and/or differences in distortion introduced in different received versions of the beamforming initiation packet.

Based at least in part on the current communication conditions, the receiving radio frequency system 12 may determine coding (e.g., encoding and/or decoding) parameters 74 including beamforming parameters 78 (process block 100). To facilitate determining the coding parameters, in some embodiments, a set of communication conditions may be indirectly expressed as a matrix. For example, when a transmitting radio frequency system 12 utilizes N antennas 34 and the receiving radio frequency system 12 utilizes M antennas 34, a set of communication conditions may be indirectly expressed as an N×M communication condition matrix with each entry indicating a (e.g., phase, frequency, and/or magnitude) relationship between a corresponding antenna 34 of the transmitting radio frequency system 12 and a corresponding antenna 34 of the receiving radio frequency system 12.

As described above, in some embodiments, the coding (e.g., decoding) parameters 74 to be used by the receiving radio frequency system 12 may be determined to generally reverse the beamforming (e.g., encoding) parameters 78 used by a transmitting radio frequency system 12 and the effect of transmission to the receiving radio frequency system 12. For example, when a transmitting radio frequency system 12 utilizes N antennas 34 and the receiving radio frequency system 12 utilizes M antennas 34, the receiving radio frequency system 12 may determine the set of beamforming parameters 78 as an M×N beamforming matrix with each entry indicating a phase and/or magnitude adjustment to be applied to each of up to M data streams. Additionally, the receiving radio frequency system 12 may determine the set of coding (e.g., decoding) parameters 74 to be used by the receiving radio frequency system 12 as an M×M decoding matrix, which is the inverse of a matrix resulting from combination of the M×N beamforming matrix and an N×M communication condition matrix.

The receiving (e.g., beamformee or testee) radio frequency system 12 may then transmit an updated set of beamforming parameters 78 to a transmitting (e.g., beamformer or tester) radio frequency system 12 (process block 102). During normal operation, in some embodiments, a beamformee radio frequency system 12 may wirelessly transmit a set of updated beamforming parameters 78 to a beamformer radio frequency system 12, for example, using broadcast techniques and/or beamforming techniques. On other hand, during a testing (e.g., calibration) process, in some embodiments, a testee radio frequency system 12 may transmit the updated set of beamforming parameters to a tester radio frequency system 12 using one or more wired connections, for example, to facilitate obviating wireless communication in a testing system.

To help illustrate, an example of a testing system 104, which includes a first electronic device 10E and a second electronic device 10F communicatively coupled via wired connections 106, is shown in FIG. 7. In particular, as depicted, the first radio frequency system 12A includes first transceiver circuitry 32A and multiple antennas 34—including at least a first antenna 34A and an Nth antenna 34N. Additionally, as depicted, the second radio frequency system 12B includes second transceiver circuitry 32B and multiple antennas 34—including at least a second antenna 34B and an Mth antenna 34M.

Since both radio frequency systems 12 include multiple antennas 34, as in the depicted example, the testing system 104 may be operated to concurrently communicate multiple data streams 107—including at least a first data stream 107A and an Mth data stream 107M. However, it should be appreciated that the depicted example is merely intended to be illustrative and not limiting. For example, in other embodiments, the testing system 104 may be operate to communicate a single data stream 107 or more than two (e.g., three or eight) data streams 107.

As described above, to facilitate communicating using beamforming techniques, radio frequency systems 12 may include coding circuitry 84 that operates (e.g., routes and/or processes) on electrical signals based at least in part on coding parameters 74. Thus, to test beamforming performance, as depicted, the first transceiver circuitry 32A includes first coding circuitry 84A and the second transceiver circuitry 32B includes second coding circuitry 84B. As such, in some embodiments, one of the first radio frequency system 12A and the second radio frequency system 12B may act as a tester radio frequency system 12, which operates similarly to a beamformer in a wireless communication system 80, while the other acts as a testee radio frequency system 12, which operates similarly to a beamformee in the wireless communication system 80.

However, in the testing system 104, as depicted, the first radio frequency system 12A and the second radio frequency system 12B may be coupled via one or more wired connections 106. For example, a first wired connection 106A may be coupled between the first radio frequency system 12A and the second radio frequency system 12B in a manner that bypasses the antennas 34 of the first radio frequency system 12A and the second antenna 34B of the second radio frequency system 12B. Additionally, an Mth wired connection 106M may be coupled between the first radio frequency system 12A and the second radio frequency system 12B in a manner that bypasses the antennas 34 of the first radio frequency system 12A and the Mth antenna 34M of the second radio frequency system 12B.

Moreover, as in the depicted example, a feedback wired connection 106F may be coupled between the first radio frequency system 12A and the second radio frequency system 12B. In some embodiments, the feedback wired connection 106 may be dedicated to communication of beamforming parameters 78. In other embodiments, the feedback wired connection 106 may obviated and, thus, optional, for example, due to the testing system 104 instead returning beamforming parameters 78 using the first wired connection 106A and/or the Mth wired connection 106M.

Additionally, in some embodiments, one or more of the wired connections 106 may be included in a cable bundle. For example, the first wired connection 106A, the Mth wired connection 106M, the feedback wired connection 106F, or any combination thereof may be included in a cable bundle connected between the first radio frequency system 12A and the second radio frequency system 12B. In other words, in some embodiments, the first transceiver circuitry 32A of the first radio frequency system 12A and the second transceiver circuitry 32B of the second radio frequency system 12B may be directly wired together, which, at least in some instances, may obviate wireless communication in the testing system 104 and, thus, complete physical reproduction of communication conditions during the testing (e.g., calibration) process.

Instead, during the testing process, a tester radio frequency system 12 may emulate the effects of wireless transmission via a wireless communication channel 82, for example, without actually transmitting packets via the wireless communication channel 82. To emulate wireless transmission via a wireless communication channel 82, as described above, the tester radio frequency system 12 may route and/or process a (e.g., data or beamforming initiation) packet based on a set of channel emulation parameters 76, for example, in addition to a set of beamforming parameters 78. In other words, although generally operating in a similar manner, operation of a tester radio frequency system 12 may nevertheless differ slightly from normal operation of a beamformer radio frequency system 12 in a wireless communication system 80.

Figure 11:
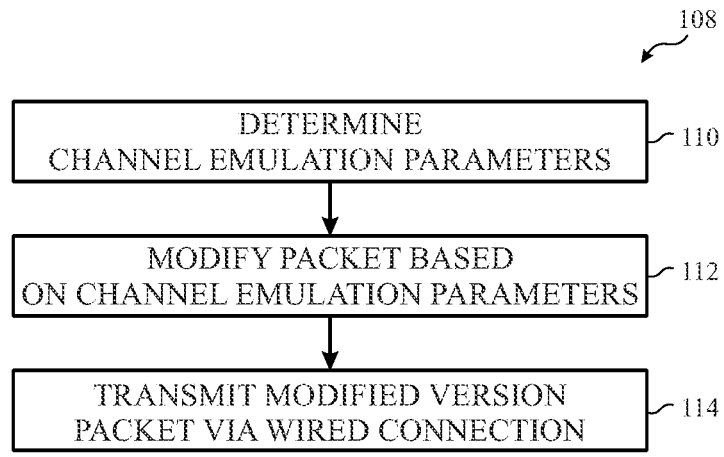
FIG. 11 is a flow diagram of an example process for operating the transmitting radio frequency system of FIG. 10 during a testing process, in accordance with an embodiment of the present disclosure.

To help illustrate, an example of a process 108 for operating a tester radio frequency system 12 is described in FIG. 11. Generally, the process 108 includes determining channel emulation parameters (process block 110), modifying a packet based on the channel emulation parameters (process block 112), and transmitting a modified version of the packet via a wired connection (process block 114). In some embodiments, the packet may be a beamforming initiation packet. Additionally or alternatively, the packet may be a data packet, for example, included in a data stream 107 transmitted after return of updated beamforming parameters 78.

Although described in a particular order, which represents a particular embodiment, it should be noted that the process 108 may be performed in any suitable order. Additionally, embodiments of the process 108 may omit process blocks and/or include additional process blocks. Moreover, in some embodiments, the process 108 may be implemented at least in part by executing instructions stored in a tangible, non-transitory, computer-readable medium, such as controller memory 40, using processing circuitry, such as the controller processor 38.

Accordingly, in some embodiments, a controller 36 of a tester radio frequency system 12 may determine a set of channel emulation parameters 76 (process block 110). As described above, in some embodiments, a set of channel emulation parameters 76 may facilitate emulating the effect of transmission via a wireless communication channel 82 by describing an expected relationship between each antenna 34 of a transmitting (e.g., tester or beamformer) radio frequency system 12 and each antenna 34 of a receiving (e.g., testee or beamformee) radio frequency system 12. For example, when a transmitting radio frequency system 12 utilizes N antennas 34 and the receiving radio frequency system 12 utilizes M antennas 34, the set of channel emulation parameters 76 may be expressed as an N×M channel emulation matrix with each entry indicating a (e.g., phase, frequency, and/or magnitude) relationship between a corresponding antenna 34 of the transmitting radio frequency system 12 and a corresponding antenna 34 of the receiving radio frequency system 12.

However, in some embodiments, the number of antennas 34 included in the tester radio frequency system 12 may actually differ from the number of antennas 34 that will be included in a beamformer radio frequency system 12, for example, since wireless communication may be obviated during the testing (e.g., calibration) process. In fact, in some embodiments, the tester radio frequency system 12 may be implemented without antennas 34. At least in some instances, utilizing a tester radio frequency system 12 with a different number of antennas 34 compared to a target (e.g., actual) beamformer radio frequency system 12 may facilitate further improving testing and/or calibration efficiency, for example, by enabling beamformee performance of a radio frequency system 12 to be tested and/or calibrated before design of the target beamformer radio frequency system 12 is completed.

Additionally, in some embodiments, various sets of channel emulation parameters 76 may be pre-determined and stored in a tangible, non-transitory, computer-readable medium of a testing system 104, such as controller memory 40. Thus, in such embodiments, the tester radio frequency system 12 may retrieve a set of channel emulation parameters 76 to be tested from the tangible, non-transitory, computer-readable medium. Additionally or alternatively, the channel emulation parameters 76 may be manually input, for example, via one or more user inputs received via an input device 14. In fact, in some embodiments, operation under different sets of communication conditions may be tested merely by adjusting the channel emulation parameters 76. For example, the number of antennas 34 used by the radio frequency systems 12 may be adjusted by adjusting dimensions of a channel emulation matrix.

Additionally, the tester radio frequency system 12 may modify a (e.g., data or beamforming initiation) packet based at least in part on coding (e.g., encoding) parameters 74 including the channel emulation parameters 76 (process block 112). As described above, in some embodiments, the coding (e.g., encoding) parameters 74 may also include beamforming parameters 78. As such, in some embodiments, the tester radio frequency system 12 may adjust magnitude and/or phase of an electrical signal based at least in part on the channel emulation parameters 76 and the beamforming parameters 78.

However, as described above, in some embodiments, the tester radio frequency system 12 may process different packets using different sets of beamforming parameters 78. For example, when a packet is a beamforming initiation packet, the tester radio frequency system 12 may utilize a default set of beamforming parameters 78, which results in application of uniform gains and uniform phase shifts. On the other hand, when a packet is a data packet transmitted after the beamforming initiation packet, the tester radio frequency system 12 may utilize an updated set of beamforming parameters 78 returned from a testee radio frequency system 12, for example, which results in application of varied gains and/or varied phase shifts.

Moreover, as described above, a set of beamforming parameters 78 to be utilized by the tester radio frequency system 12 may be determined based at least in part on communication conditions. For example, when a transmitting radio frequency system 12 utilizes N antennas 34 and the receiving radio frequency system 12 utilizes M antennas 34, the beamforming parameters 78 may be expressed as an M×N beamforming matrix with each entry indicating a phase and/or magnitude adjustment to be applied to each of up to M data streams 107.

In some embodiments, the tester radio frequency system 12 may successively apply the beamforming parameters 78 followed by the channel emulation parameters 76, for example, by applying a set of beamforming parameters 78 followed by a set of channel emulation parameters 76. In other words, when a transmitting radio frequency system 12 utilizes N antennas 34 and a receiving radio frequency system 12 utilizes M antennas 34, the tester radio frequency system 12 may apply an M×N beamforming matrix followed by an N×M channel emulation matrix and, thus, effectively applying an M×M encoding matrix. Accordingly, in other embodiments, the tester radio frequency system 12 may process and/or route a packet based at least in part on the M×M encoding matrix, thereby producing up to M modified versions of the packet.

The tester radio frequency system 12 may then transmit one or more modified versions of the packet via one or more wired connections 106 (process block 114). For example, the tester radio frequency system 12 may transmit a first modified version of the packet to transceiver circuitry 32 of a testee radio frequency system 12 via a first wired connection 106A and an Mth modified version of the packet to the transceiver circuitry 32 of the testee radio frequency system 12 via an Mth wired connection 106M. As described above, when the packet transmitted to the testee radio frequency system 12 is a data packet, a testing system 104 may determine performance of the testee radio frequency system 12 as a beamformee and adaptively adjust operation of the testee radio frequency system 12 accordingly.

Figure 12:
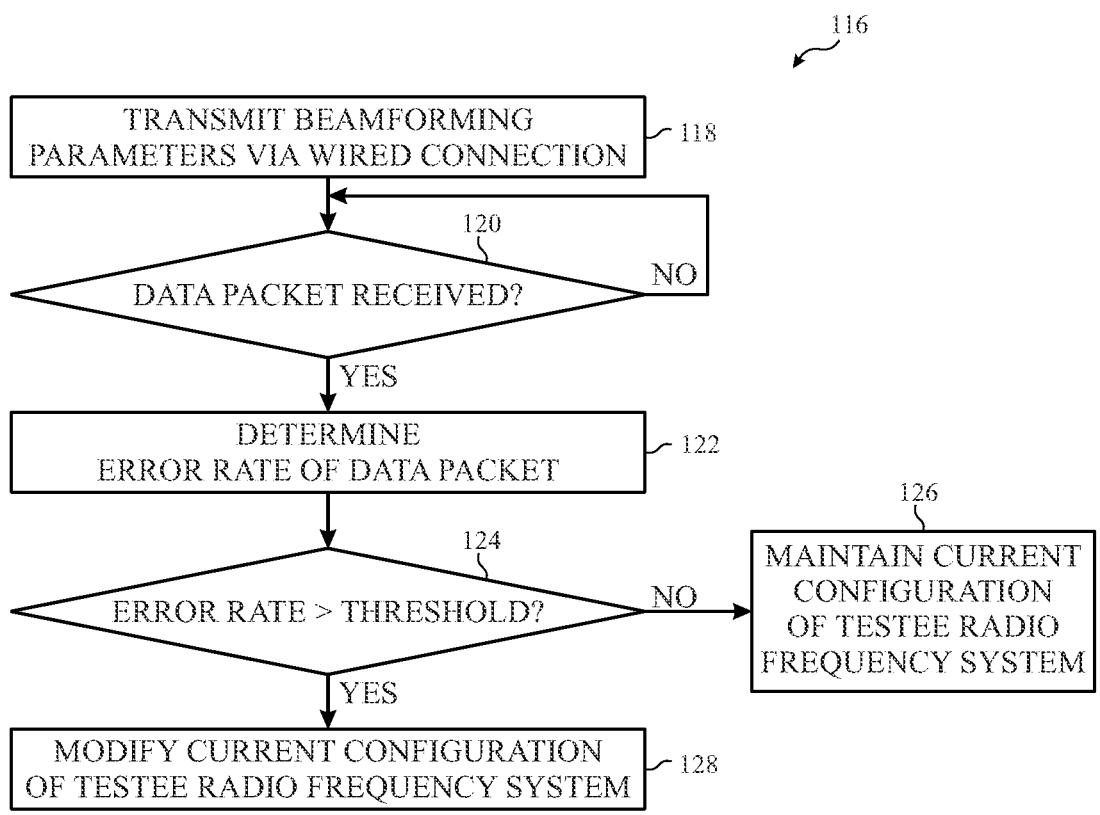
FIG. 12 is a flow diagram of an example process for operating the receiving radio frequency system of FIG. 10 during the testing process, in accordance with an embodiment of the present disclosure.

To help illustrate, an example of a process 116 for operating a testing system 104 and/or a testee radio frequency system 12 included in the testing system 104 is described in FIG. 12. Generally, the process 116 includes transmitting beamforming parameters via a wired connection (process block 118), determining whether a data packet has been received (decision block 120), and determining an error rate of the data packet after receipt of the data packet (process block 122). Additionally, the process 116 includes determining whether the error rate is greater than an error threshold (decision block 124), maintaining a current configuration of a testee radio frequency system when the error rate is not greater than the error threshold (process block 126), and modifying the current configuration of the testee radio frequency system when the error rate is greater than the error threshold (process block 128).

Although described in a particular order, which represents a particular embodiment, it should be noted that the process 116 may be performed in any suitable order. Additionally, embodiments of the process 116 may omit process blocks and/or include additional process blocks. Moreover, in some embodiments, the process 116 may be implemented at least in part by executing instructions stored in a tangible, non-transitory, computer-readable medium, such as controller memory 40, using processing circuitry, such as the controller processor 38.

Accordingly, in some embodiments, a controller 36 in a testing system 104 may instruct a testee radio frequency system 12 to transmit a set of beamforming parameters 78 to a tester radio frequency system 12 via one or more wired connections 106, for example, by switching a time division duplex (TDD) switching device 66 in the testee radio frequency system 12 to its transmission state (process block 118). As described above, in some embodiments, the testee radio frequency system 12 may transmit the beamforming parameters 78 via a feedback wired connection 106F. Additionally or alternatively, the testee radio frequency system 12 may transmit the beamforming parameters 78 via another wired connection 106, such as a first wired connection 106A or an Mth wired connection 106M, coupled between transceiver circuitry 32 of the testee radio frequency system 12 and transceiver circuitry of the tester radio frequency system 12. Furthermore, as described above, the tester radio frequency system 12 may operate on subsequent data packets based at least in part on an updated set of beamforming parameters 78 returned from the testee radio frequency system 12 and transmit one or more modified versions of the data packets to the testee radio frequency system 12 via corresponding wired connections 106.

Once the testee radio frequency system 12 receives a data packet from the tester radio frequency system 12, the testing system 104 (e.g., testee radio frequency system 12) may determine an error rate of the data packet (process block 122). In some embodiments, an original version of one or more data packets to be transmitted during the testing process may be pre-determined and stored in a tangible, non-transitory, computer-readable medium of the testing system 104, such as controller memory 40. Thus, in such embodiments, the testing system 104 may retrieve the original version of a data packet from the tangible, non-transitory, computer-readable medium and compare one or more received versions of the data packet with the original version to determine a (e.g., absolute) distortion and, thus, an (e.g., absolute) error rate produced in the data packet due to application of the updated set of beamforming parameters 78 by the tester radio frequency system 12. Additionally or alternatively, the testing system 104 may compare different versions of the data packet received from the tester radio frequency system 12 to determine a (e.g., relative) distortion and, thus, an (e.g., relative) error rate produced in the data packet due to application of the updated set of beamforming parameters 78.

Furthermore, the testing system 104 (e.g., testee radio frequency system 12) may determine whether the error rate of the data packet is greater than an error threshold (decision block 124). In some embodiments, the error threshold may be pre-determined and stored in a tangible, non-transitory, computer-readable medium of the testing system 104, such as controller memory 40. Thus, in such embodiments, the testing system 104 may retrieve the error threshold from the tangible, non-transitory, computer-readable medium and compare the error rate of the data packet against the error threshold.

When the error rate is not greater than the error threshold, the testing system 104 may determine that performance of the testee radio frequency system 12 as a beamformee is satisfactory and, thus, a current configuration of the testee radio frequency system 12 (process block 126). In other words, when the error rate is not greater than the error threshold, the testing system 104 may maintain the current configuration of the testee radio frequency system 12 such that subsequent determination of the same communication conditions by the testee radio frequency system 12 results in determination of the same set of updated beamforming parameters 78. On the other hand, when the error rate of the data packet is greater than the error threshold, the testing system 104 may determine that performance of the testee radio frequency system 12 as a beamformee is not satisfactory and, thus, adjust the current configuration of the testee radio frequency system 12 (process block 128). In other words, when the error rate is greater than the error threshold, the testing system 104 may adjust the current configuration of the testee radio frequency system 12 such that subsequent determination of the same communication conditions by the testee radio frequency system 12 results in determination of a different set of updated beamforming parameters 78.

In this manner, the techniques described in the present disclosure may facilitate improving testing and/or calibration efficiency of radio frequency systems. As described above, at least in some instances, wireless communication performance of a radio frequency system under various sets of communication conditions may be tested and/or calibrated, for example, before commercial deployment of the radio frequency system and/or an electronic device including the radio frequency system. Since physically reproducing wireless communication conditions is often a complex and/or time consuming process, the present disclosure provides techniques that enable testing and/or calibrating wireless communication performance of a radio frequency system via one or more wired connections, for example, by emulating the effect of wireless transmission via a wireless communication channel. In other words, the techniques described in the present disclosure may enable obviating actual wireless communication and, thus, complete physical reproduction of communication condition, which, at least in some instances, may facilitate improving testing and/or calibration efficiency of radio frequency systems.

The specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

What is claimed is:
1. A testing system, comprising:
a first radio frequency system comprising a first plurality of antennas; and
a second radio frequency system comprising a second plurality of antennas, wherein the second radio frequency system is configured to:
transmit a first signal indicative of a first data packet to the first radio frequency system;
receive a coding parameter from the first radio frequency system via a wired connection that bypasses the first plurality of antennas and the second plurality of antennas, wherein the coding parameter indicates a difference between the first signal after being received by the first radio frequency system and the first signal prior to being received by the first radio frequency system; and emulate wireless transmission of data from the second plurality of antennas by adjusting a phase of a second signal indicative of a second data packet to have a same phase as the first signal after being received by the first radio frequency system based at least in part on the coding parameter.

2. The testing system of claim 1, wherein the coding parameter comprises a channel emulation parameter indicative of an emulated effect of transmission via a wireless communication channel.

3. The testing system of claim 1, wherein the second radio frequency system is configured to transmit the first signal using one or more analog signals characterized by a signal magnitude, a signal phase, or both, that emulates an obstruction to an antenna of the first plurality of antennas or an environmental condition affecting a wireless communication channel communicatively coupling the first plurality of antennas to the second plurality of antennas.

4. The testing system of claim 1, wherein the second radio frequency system is configured to transmit the second signal to a third plurality of antennas of a third radio frequency system.

5. The testing system of claim 1, wherein the difference comprises an amount of distortion expected when a first antenna of the first plurality of antennas wirelessly communicates with a second antenna of the second plurality of antennas.

6. The testing system of claim 1, wherein the coding parameter emulates an effect of a communication condition being tested.

7. The testing system of claim 1, wherein the coding parameter comprises a matrix of a plurality of values corresponding to a plurality of antenna pairings between the first plurality of antennas and the second plurality of antennas.

8. The testing system of claim 7, wherein the plurality of values comprises a first plurality of indications of phase relationships for at least some of the plurality of antenna pairings, a second plurality of indications of frequency relationships for at least some of the plurality of antenna pairings, a third plurality of indications of magnitude relationships for at least some of the plurality of antenna pairings, or any combination thereof.

9. The testing system of claim 1, wherein the first radio frequency system is configured to:
receive the first signal from the second radio frequency system;
compare the received first data packet to the transmitted first data packet to determine the difference;
generate the coding parameter to indicate the difference; and
transmit the coding parameter to the second radio frequency system.

10. An electronic device, comprising:
a memory configured to store a first signal indicative of a first data packet;
an antenna; and
a controller coupled to the antenna and the memory, wherein the controller is configured to:
receive a second signal indicative of the first data packet from a radio frequency system, wherein the radio frequency system is configured to emulate wireless transmission of the first data packet by adjusting a magnitude, a phase, or both, of the second signal based on the first signal;
compare the second signal to the first signal to determine a difference between the second signal and the first signal;
generate a coding parameter based at least in part on the difference, wherein the coding parameter is configured to cause the radio frequency system to adjust a phase of a third signal to have a same phase as the second signal; and
transmit the coding parameter to the radio frequency system via a wired connection that bypasses the antenna.

11. The electronic device of claim 10, wherein the controller is configured to receive a fourth signal indicative of a third data packet from the radio frequency system, and wherein the radio frequency system is configured to adjust a magnitude, a phase, or both of the fourth signal indicative of the third data packet based at least in part on the coding parameter.

12. The electronic device of claim 10, comprising a plurality of antennas including the antenna, wherein the wired connection bypasses the plurality of antennas.

13. The electronic device of claim 10, wherein the coding parameter indicates one or more operational parameters of the radio frequency system, one or more channel parameters, a communication condition, a phase relationship between the antenna and an additional antenna of the radio frequency system, one or more magnitude relationships between the antenna and an additional antenna of the radio frequency system, or any combination thereof.

14. The electronic device of claim 10, comprising transceiver circuitry associated with the antenna, wherein the controller is configured to:
receive a signal indicative of the first data packet from the radio frequency system; and
determine the coding parameter based at least in part on a current configuration of the transceiver circuitry and the received signal indicative of the first data packet.

15. A method comprising:
receiving, using transceiver circuitry, a signal indicative of a first data packet from a radio frequency system;
determining a coding parameter based at least in part on a current configuration of the transceiver circuitry and the received signal indicative of the first data packet; and
transmitting, using the transceiver circuitry, the coding parameter to the radio frequency system via a wired connection configured to couple the transceiver circuitry and the radio frequency system.

16. The method of claim 15, wherein determining the coding parameter comprises determining a channel emulation parameter that indicates a phase relationship, a frequency relationship, a magnitude relationship, or any combination thereof, between an antenna coupled to the transceiver circuitry and an antenna of the radio frequency system.

17. The method of claim 15, comprising receiving, using the transceiver circuitry, a signal indicative of a second data packet from the radio frequency system, wherein the radio frequency system is configured to modify the signal indicative of the second data packet based at least in part on the coding parameter.

18. The method of claim 15, wherein the received signal indicative of the first data packet comprises one or more analog signals characterized by a magnitude, a phase, or both, and wherein the one or more analog signals emulate wireless transmission of the signal indicative of the first data packet between the transceiver circuitry and the radio frequency system.

19. The method of claim 15, comprising:
- determining a packet error rate;
- determining that the packet error rate is greater than an error threshold value; and
- in response to the packet error rate being greater than the error threshold value, generating the current configuration of the transceiver circuitry based on a previous configuration of the transceiver circuitry.

* * * * *